United States Patent [19]

Gulley et al.

[11] Patent Number: 5,025,407
[45] Date of Patent: Jun. 18, 1991

[54] GRAPHICS FLOATING POINT COPROCESSOR HAVING MATRIX CAPABILITIES

[75] Inventors: David W. Gulley; Jerry R. Van Aken, both of Sugar Land, Tex.

[73] Assignee: Texas Instruments Incorporated, Dallas, Tex.

[21] Appl. No.: 387,459

[22] Filed: Jul. 28, 1989

[51] Int. Cl.$^5$ .............................................. G06F 7/52
[52] U.S. Cl. .................................... 364/754; 364/736
[58] Field of Search ................ 364/754, 736, 748, 518

[56] References Cited

U.S. PATENT DOCUMENTS

| | | | |
|---|---|---|---|
| 3,763,365 | 10/1973 | Seitz | 364/754 |
| 4,493,048 | 1/1985 | Kung et al. | 364/754 |
| 4,697,247 | 9/1987 | Grinberg et al. | 364/754 |
| 4,719,588 | 1/1988 | Tatemichi et al. | 364/754 |
| 4,878,190 | 10/1989 | Darley et al. | 364/752 |
| 4,916,651 | 4/1990 | Gill et al. | 364/736 |

OTHER PUBLICATIONS

Mokhoff, N., Graphics Chips Forge High-Res Boards for PCs, Workstations, *Electronic Design*, Mar. 17, 1988, pp. 62-72.

Whitton, M., N. England, and C. DeMonico, Manage Design Trade-Offs in High-End Graphics Board, *Electronic Design*, Mar. 17, 1988, pp. 77-84.

Foley, J. D., and A. Van Dam, *Fundamentals of Interactive Computer Graphics*, Reading, Mass: Addison-Wesley, 1982, pp. 245-265, 274-279, 297-302.

Newman, W. M., and R. F. Sproull, *Principles of Interactive Computer Graphics*, 2nd ed., New York: McGraw-Hill, 1979, pp. 57-60, 333-351, 491-501.

*Primary Examiner*—Dale M. Shaw
*Assistant Examiner*—Long T. Nguyen
*Attorney, Agent, or Firm*—James F. Hollander; James T. Comfort; Melvin Sharp

[57] ABSTRACT

A graphics coprocessor designed to work in conjunction with a host graphic processor in a graphics system. The coprocessor is adapted to perform arithmetic calculations including matrix calculations. The matrix size is such that the intermediate results require more registers than are practical to include in the coprocessor. This has been solved by arranging for certain selected ones of the intermediate results to continue within the program execution from stage to stage and avoiding intermediate storage.

14 Claims, 8 Drawing Sheets

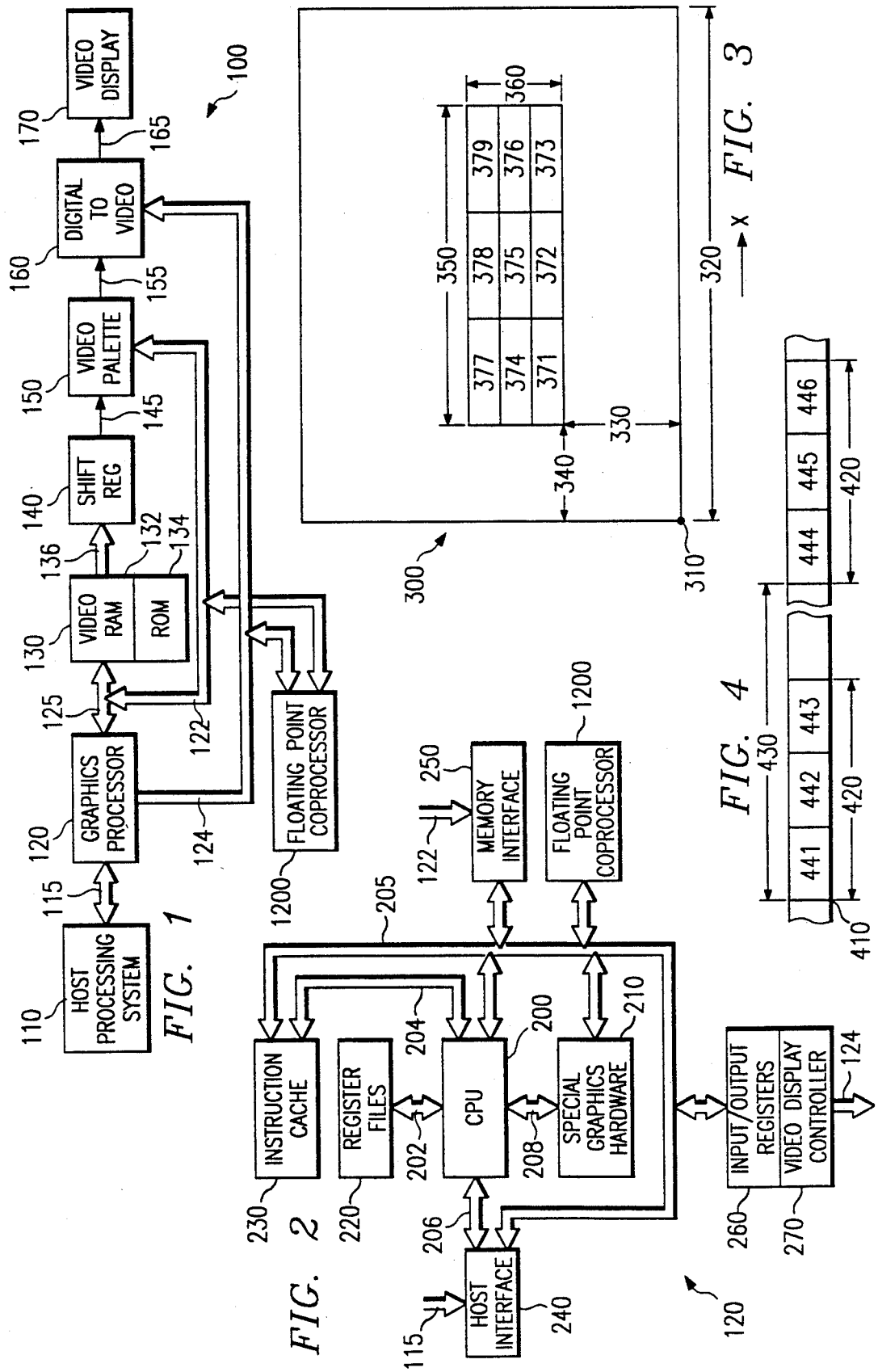

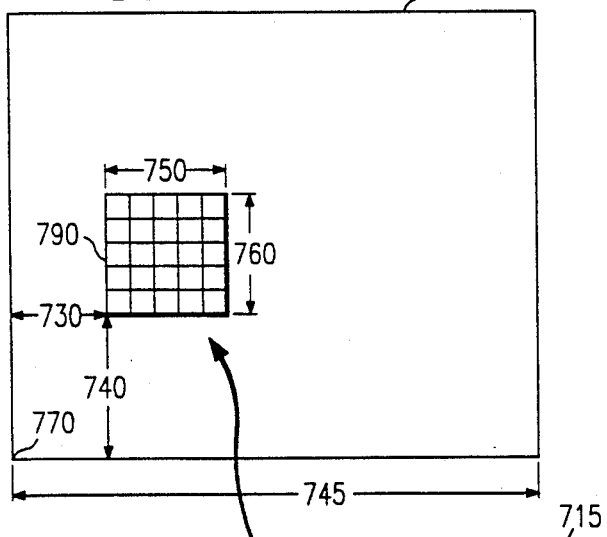
FIG. 5
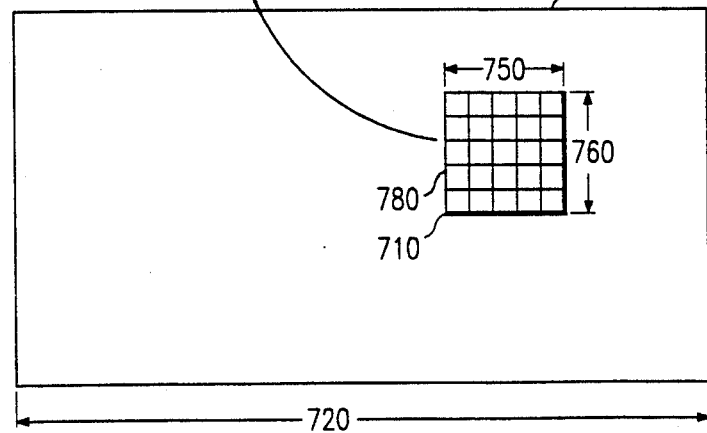
FIG. 7
FIG. 6
| | |
|---|---|
| 220 | SOURCE ADDRESS |
| 601 | SOURCE PITCH |
| 602 | DESTINATION ADDRESS |
| 603 | DESTINATION PITCH |
| 604 | OFFSET |
| 605 | WINDOW START |
| 606 | WINDOW END |
| 607 | DELTA Y / DELTA X |
| 608 | COLOR 0 |
| 609 | COLOR 1 |
| 610 | STACK POINTER |
| 611 | |

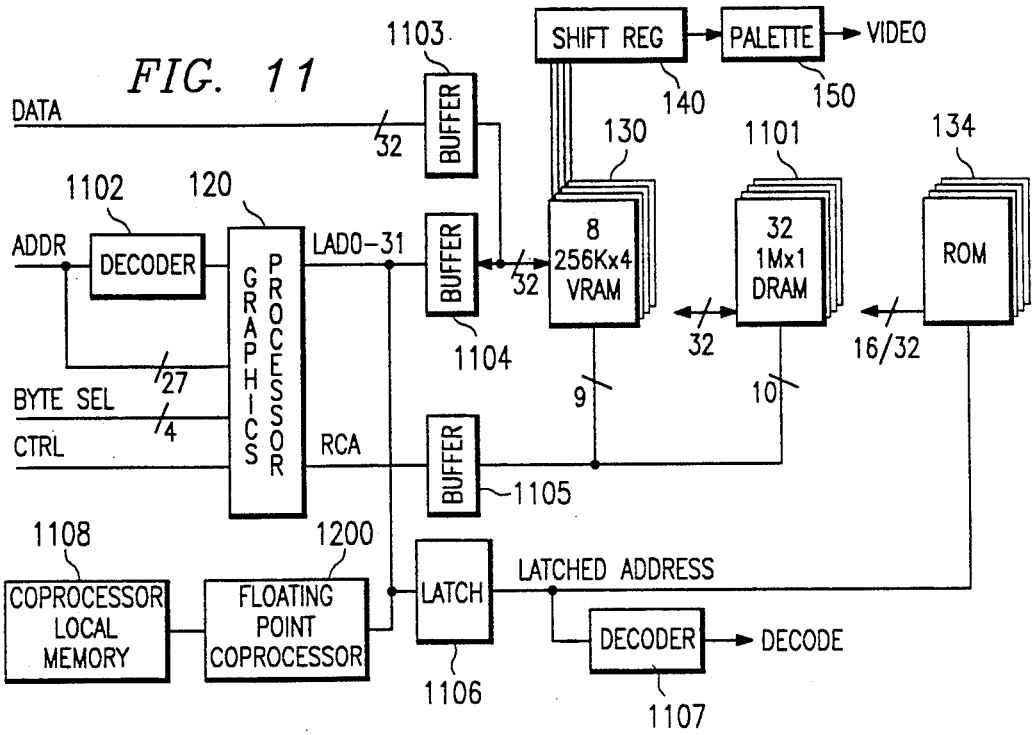
FIG. 11
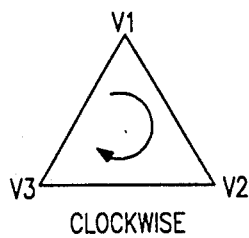
FIG. 16 CLOCKWISE
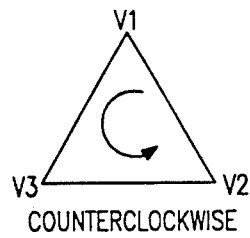
FIG. 17 COUNTERCLOCKWISE
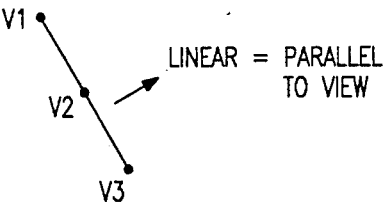
FIG. 18
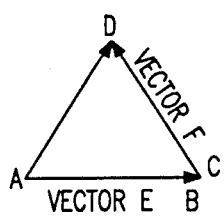
FIG. 20
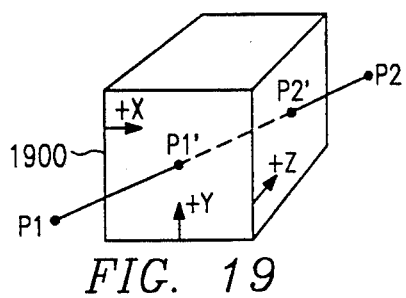
FIG. 19
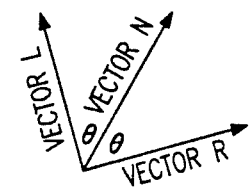
FIG. 21

TO FIG. 14

GRAPHICS FLOATING POINT COPROCESSOR HAVING MATRIX CAPABILITIES

TECHNICAL FIELD OF THE INVENTION

This invention relates to graphical processors and more particularly to graphical floating point coprocessors having matrix arithmetic capabilities.

CROSS REFERENCE TO RELATED APPLICATIONS

All of the following patent applications are cross-referenced to one another, and all have been assigned to Texas Instruments Incorporated. These applications have been concurrently filed and are hereby incorporated in this patent application by reference.

| Attorney Docket # | Serial # | Filing date | Title |
|---|---|---|---|
| TI-13495 | 387,568 | 07/28/89 | Video Graphics Display Memory Swizzle Logic and Expansion Circuit and Method |
| TI-14258 | 387,567 | 07/28/89 | Video Graphics Display Memory Swizzle Logic Circuit and Method |
| TI-14356 | 387,459 | 07/28/89 | Graphics Floating Point Coprocessor Having Matrix Capabilities |
| TI-14309 | 387,242 | 07/28/89 | Graphics Processor Trapezoidal Fill Instruction Method and Apparatus |
| TI-14310 | 387,550 | 07/28/89 | Graphic Processor Three-Operand Pixel Transfer Method and Apparatus |
| TI-14311 | 387,119 | 07/28/89 | Graphics Processor Plane Mask Mode Method and Apparatus |
| TI-14312 | 386,936 | 07/28/89 | Dynamically Adaptable Memory Controller For Various Size Memories |
| TI-14313 | 387,472 | 07/28/89 | Graphics Processor Having a Floating Point Coprocessor |
| TI-14314 | 387,553 | 07/28/89 | Register Write Bit Protection Apparatus and Method |
| TI-14315 | 387,569 | 07/28/89 | Graphics Display Split-Serial Register System |
| TI-14316 | 387,455 | 07/28/89 | Multiprocessing Multiple Priority Bus Request Apparatus and Method |
| TI-14317 | 387,325 | 07/28/89 | Processing System Using Dynamic Selection of Big and Little Endian Coding |
| TI-14318 | 386,057 | 07/28/89 | Graphics Processor Nonconfined Address Calculation System |
| TI-14320 | 386,850 | 07/28/89 | Real Time and Slow Memory Access Mixed Bus Usage |
| TI-14399 | 387,479 | 07/28/89 | Graphics Coprocessor Having Imaging Capability |
| TI-14400 | 387,255 | 07/28/89 | Graphics Floating Point Coprocessor Having Stand-Alone Graphics Capability |
| TI-14401 | 387,243 | 07/28/89 | Graphics Floating Point Coprocessor Having Vector Mathematics Capability |
| TIL-13407 | 386,849 | 07/28/89 | Improvements in or Relating to Read-Only Memory |
| TIL-13494 | 387,266 | 07/28/89 | Method and Apparatus for Indicating When a Total in a Counter Reaches a Given Number |

BACKGROUND OF THE INVENTION

In graphic presentation systems, a large amount of data must be presented to a video screen in a short amount of time. This problem is compounded in that this information is constantly moving, and must be manipulated in real-time so as not to affect the visual sense of the viewer. An appreciation of the problem arises from an understanding that each line of a video screen has typically 1280 pixels or points per line, and 1024 lines, each pixel having, perhaps, 8 bits of data associated therewith.

It is easy to understand then that to move an image, or to rotate the image to create 3-D graphics, or to perform any other of a number of functions, a very large number of mathematical calculations must be made for every instant of time for every pixel on the screen. This is not only burdensome to a processor, but potentially could cause a graphics processor to have severe limitations on its ability to perform properly.

Co-processors, on the other hand, have long been known in the art to perform mathematical operations separate from the main processor. These coprocessors typically operate as an adjunct to a host computer by accepting from the host a set of operands and an instruction as to the operation to be performed on the operands. When this operation is accomplished, the result is returned to the host for utilization. For a series of calculations, the host passes a series of operands to the coprocessor for manipulation. However, if this were to be attempted for graphics presentation, the number of communications between the main or host processor and the coprocessor would be significant at best and, given the complex matrix additions and multiplications necessary, each with many substeps, a limit of operation would soon be reached.

Thus, there is needed in the art an arrangement for allowing complicated mathematics to be performed at the direction of a host processor, but without burdening the data transfer capability between the host and the coprocessor.

Several other problems arise out of the fact that these mathematic operations must be performed in a very small amount of time. These problems relate to the movement of data back and forth from register to register and from place to place for each type of calculation. Such movement, if performed at all, must be accomplished in a minimum amount of time and with minimum disruption to the processor and to other active memories. Some of these functions which must be performed are matrix mathematics, vector instructions and manipulation, image processing and graphics manipulations. Along with these basic functions there are a host of other calculations and manipulations that must be performed on the data bits if the graphics system is to be accepted by demanding users.

One important attribute of graphics is the need for accuracy, especially when large numbers are manipulated many times. Systems that use only integers in order to save time or processing capacity or systems that round-off numbers to one or two decimal places ultimately have limitations on their use.

To compose a matrix requires a series of multiplications and additions. For example, to compose a 4×4 matrix from two 4×4 matrices involves 64 multiplies and 48 adds. And so, in a coprocessor environment, it becomes very important to be able to do those multiplies and adds very quickly.

Thus, there is a further need in the art for a graphic processing system arranged to perform a continuing stream of highly complex mathematical calculations in a very short interval of time and to do so with a minimum of data transfer and interference from external processors and with a limited number of internal registers.

There is a further need in the art to accomplish complex graphical mathematics in a precise manner allowing for full floating point accuracy.

SUMMARY OF THE INVENTION

There is designed a graphics coprocessor which receives a single instruction statement from the main processor and then, using its own microcode, determines the steps that must be taken to perform all of the necessary calculations, returning to the main processor only the resultant answer. The coprocessor does not necessarily return to the host processor any of the intermediate results which were used to arrive at the new data position. These calculations could be vectors which are representative, for example, of pixel points on a video graphic display and the operations performed could be matrix arithmetic operations. Thus, using the coprocessor there is no need for the main processor to cycle-by-cycle initiate the various mathematical operations that are required, but rather the main processor provides to the coprocessor the initial data and a statement of what is to be obtained, and the coprocessor, using is own microcode and communicating, if necessary, to its own memory, then proceeds to generate the result.

Special registers have been added to the coprocessor so that transforms of various types can be performed. These registers are available so that the main processor can use the generated data when it needs to at its own clock rate.

The coprocessor is designed to handle floating point arithmetic to insure the precision of the output data. The coprocessor is designed to stand alone or to work in cooperation with a main processor.

The problem that must be solved is controlling the flow of data between the coprocessor and the main processor. The coprocessor can execute very quickly, and thus becomes data-limited if information must be passed back and forth. To solve this problem, a series of instructions were established to minimize the amount of data that had to be transferred between the main processor and the coprocessor while at the same time keeping the amount of data checking at a minimum. This allows the main processor to be very flexible in that various instruction strings can be created external to the coprocessor. Each of the instructions, as it executes, takes its input data values from the bus or from internal registers and performs the particular set of operations on them. In many cases, the output data values are left in the coprocessor registers in such a fashion that the data is ready to be executed by subsequent graphics instructions.

For example, in the case of the check vertex (FXCKVTX) instruction, all vertices of a polygon are tested to see if the polygon is totally within the clipping volume or totally out of the clipping volume or crossing the volume boundaries. When that instruction completes, the values are left in the registers ready to be used by the clipping instruction (FXCLIPF) to determine whether or not the line segment between two vertices in question (the first vertex and the last vertex of the polygon) crosses the clipping volume.

Another major problem that has been solved was reduction from 6 to 3 in the number of passes that have to be made through the data in order to determine what portions of a polygon should be clipped. The system has been arranged to allow three passes through the data and clipping to a plane pair in each pass. The two-plane clipping is provided by the clip-forward and the clip-reverse commands of the coprocessor, which take the two vertices and associated clipping volume and determine whether or not the line segment between the two vertices cross that clipping volume, and if they do, the line segment is truncated to the clipping volume.

A 4×4 matrix multiplied by a 4×4 matrix would ideally require a total of 48 registers to store both initial 4×4 matrices and the resulting composite matrix. In the case of the matrix, a minimum number of registers, 20, are used such that one 4×4 matrix is loaded into the coprocessor registers, and the elements of the other 4×4 matrix are moved through the coprocessor as the calculations are being made for the composite matrix. Thus, there are four matrix instructions that allow for the multiplication of the matrix elements of the first 4×4 matrix by a single element of the second 4×4 matrix to result in one vector in the composite matrix. These instructions are then repeated 4 times each to generate the composite matrix. Thus, by making the coprocessor self-sufficient, there is a large savings of time and equipment, as well as data bus bandwidth.

The matrix instructions were designed to maintain as much data within the coprocessor as possible and allow the coprocessor to perform all the multiplies and adds required for the specific matrix operations. The matrix instructions that are provided allow the multiplication of a single matrix by elements of another matrix and generate the results of the composite matrix of these two. The problem solved by the matrix instructions is to, in a limited register set, provide the maximum utilization of those registers to do a 16-element matrix multiplied by another 16-element matrix, although there are only a few registers available.

In a similar manner, numerous solutions have been incorporated in the coprocessor to a allow for vector processing and development, image processing and graphics instruction processing.

It is a technical advantage of this invention that a graphics processor communicates with a coprocessor in which the coprocessor is capable of manipulating data independent of the graphics processor and where the coprocessor is capable of both independent operation and capable of performing arithmetics with floating point precision.

BRIEF DESCRIPTION OF THE DRAWINGS

For a more complete understanding of the present invention and for further features and advantages, reference is now made to the following Detailed Description, taken in conjunction with the accompanying Drawings, in which:

FIG. 1 illustrates a block diagram of a computer with graphics capability constructed in accordance with the principles of the present invention;

FIG. 2 illustrates the block diagram of a preferred embodiment of, the graphics processing circuit of the present invention;

FIG. 3 illustrates the manner of specifying individual pixel addresses within the bit mapped memory in accordance with the x-y addressing technique;

FIG. 4 illustrates a manner of specifying field addresses in accordance with the linear addressing technique;

FIG. 5 illustrates one embodiment of the storage of pixel data of varying lengths within a single data word in accordance with the preferred embodiment of the present invention;

FIG. 6 illustrates the arrangement of contents of implied operands stored within the register memory in accordance with the preferred embodiment of the present invention;

FIG. 7 illustrates the characteristics of an array move operation within the bit mapped memory of the present invention;

FIG. 11 shows an alternate schematic with the floating point coprocessor attached to the graphics processor system;

FIGS. 16, 17 and 18 show polygons facing clockwise, counterclockwise and parallel to the current view;

FIG. 19 shows a viewing volume and line segment clipping; and

FIG. 20 and 21 show vector diagrams.

DETAILED DESCRIPTION OF THE INVENTION

Figure 8:
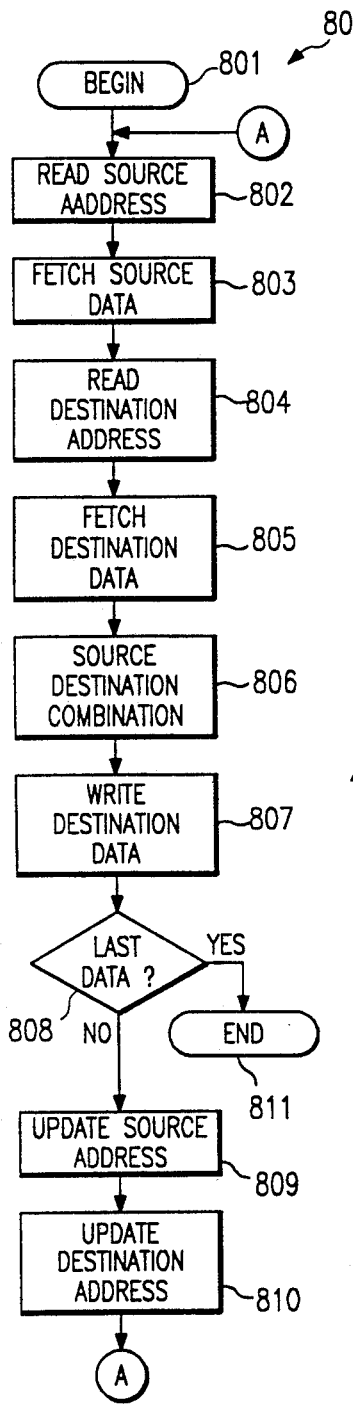
FIG. 8 illustrates a flow chart of a bit block transfer of array move operation in accordance with the present invention.

Before moving into the detailed discussion of the invention, it might be helpful to briefly review, with respect to FIGS. 1 to 10, the basic operation of a graphic processor operating in conjunction with a host system. A more complete detailed discussion can be found in patent application Ser. No. 346,388, filed Apr. 27, 1989, now continuation application Ser. No. 426,480, filed Oct. 23, 1989, and assigned to the assignee of this application. The aforementioned application is incorporated herein by reference. Also incorporated by reference herein is Texas Instruments Inc. User's Guides TMS 34010 and 34020 and Specification TMS 34020/TMS 34082, both of which documents are currently available to the general public from Texas Instruments Inc., P.O. Box 1443, Houston, Tex. 77551-1443.

FIG. 1 illustrates a block diagram of graphics computer system 100 which is constructed in accordance with the principles of the present invention. Graphics computer system 100 includes host processing system 110, graphics processor 120, memory 130, shift register 140, video palette 150, digital to video converter 160, and video display 170. This is a typical application for the invention which can be used with any number of systems.

Host processing system 110 provides the major computational capacity for the graphics computer system 100. Host processing system 110 preferably includes at least one microprocessor, read only memory, random access memory and assorted peripheral devices for forming a complete computer system. Host processing system 110 preferably also includes some form of input device, such as a keyboard or a mouse, and some form of long term storage device such as a disk drive. The details of the construction of host processing system 110 are conventional in nature and known in the art, therefore the present application will not further detail this element. The essential feature of host processing system 110, as far as the present invention is concerned, is that host processing system 110 determines the content of the visual display to be presented to the user.

Graphics processor 120 provides the major data manipulation in accordance with the present invention to generate the particular video display presented to the user. Graphics processor 120 is bidirectionally coupled to host processing system 110 via host bus 115. In accordance with the present invention, graphics processor 120 operates as an independent data processor from host processing system 110. However, it is expected that graphics processor 120 is responsive to requests from host processing system 110 via host bus 115. Graphics processor 120 further communicates with memory 130, and video palette 150 via video memory bus 122. Graphics processor 120 controls the data stored within video RAM 132 via video memory bus 122. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 120 controls the data stored within video palette 150. This feature will be further disclosed below. Lastly, graphics processor 120 controls digital to video converter 160 via video control bus 124. Graphics processor 120 may control the line length and the number of lines per frame of the video image presented to the user by control of digital to video converter 160 via video control bus 124.

Video memory 130 includes video RAM 132 which is bidirectionally coupled to graphics processor 120 via video memory bus 122 and read only memory 134. As previously stated, video RAM 134 includes the bit mapped graphics data which controls the video image presented to the user. This video data may be manipulated by graphics processor 120 via video memory bus 122. In addition, the video data corresponding to the current display screen is output from video RAM 132 via video output bus 136. The data from video output bus 136 corresponds to the picture element to be presented to the user. In the preferred embodiment, video RAM 132 is formed of a plurality of TMS44251 256K×4 dynamic random access integrated circuits (VRAMS) available from Texas Instruments Inc., the assignee of the present application. The TMS44251 integrated circuit includes dual ports, enabling display refresh and display update to occur without interference.

Shift register 140 receives the video data from video RAM 132 and assembles it into a display bit stream. In accordance with the typical arrangement of video random access memory 132, this memory consists of a bank of several separate random access memory integrated circuits. The output of each of these integrated circuits is typically only one or four bits wide. Therefore, it is necessary to assemble data from a plurality of these circuits in order to obtain a sufficiently high data output rate to specify the image to be presented to the user. Shift register 140 is loaded in parallel from video output bus 136. This data is output in series on line 145. Thus, shift register 140 assembles a display bit stream which provides video data at a rate high enough to specify the individual dots within the raster scanned video display.

Video palette 150 receives the high speed video data from shift register 140 via bus 145. Video palette 150 also receives data from graphics processor 120 via video memory bus 122. Video palette 150 converts the data received on bus 145 into a video level output on bus 155. This conversion is achieved by means of a look-up table which is specified by graphics processor 120 via video memory bus 122. The output of video palette 150 may comprise color hue and saturation for each picture element or may comprise red, green and blue primary color levels for each pixel. The table of conversion from the code stored within video memory 132 and the digital levels output via bus 155 is controlled from graphics processor 120 via video memory bus 122.

Digital to video converter 160 receives the digital video information from video palette 150 via bus 155. Digital to video converter 160 is controlled by graphics processor 120 via video control bus 124. Digital to video converter 160 serves to convert the digital output of video palette 150 into the desired analog levels for application to video display 170 via video output 165. Digital to video converter 160 is controlled for a specification of the number of pixels per horizontal line and the number of lines per frame, for example, by graphics processor 120 via video controller bus 124. Data within graphics processor 120 controls the generation of the synchronization and blanking signals and the retrace signals by digital to video converter 160. These portions of the video signal are not specified by the data stored within video memory 132, but rather form the control signals necessary for specification of the desired video output.

Lastly, video display 170 receives the video output from digital to video converter 160 via video output line 165 Video display 170 generates the specified video image for viewing by the operator of graphics computer system 100. It should be noted that video palette 150, digital to video converter 160 and video display 170 may operate in accordance to two major video techniques In the first, the video data is specified in terms of color hue and saturation for each individual pixel. In the other technique, the individual primary color levels of red, blue and green are specified for each individual pixel. Upon determination of the design choice of which of these major techniques to be employed, video palette 150, digital to analog converter 160 and video display 170 must be constructed to be compatible to this technique. However, the principles of the present invention in regard to the operation of graphics processor 120 are unchanged regardless of the particular design choice of video technique.

FIG. 2 illustrates graphics processor 120 in further detail. Graphics processor 120 includes central processing unit 200, special graphics hardware 210, register files 220, instruction cache 230, host interface 240, memory interface 250, input/output registers 260 and video display controller 270.

The heart of graphics processor 120 is central processing unit 200. Central processing unit 200 includes the capacity to do general purpose data processing including a number of arithmetic and logic operations normally included in a general purpose central processing unit. In addition, central processing unit 200 controls a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectionally coupled to a set of register files, including a number of data registers, via bidirectional register bus 202. Register files 220 serve as the depository of the immediately accessible data used by central processing unit 200. As will be further detailed below, register files 220 include, in addition to general purpose registers which may be employed by central processing unit 200, a number of data registers which are employed to store implied operands for graphics instructions.

Central processing unit 200 is connected to instruction cache 230 via instruction cache bus 204. Instruction cache 230 is further coupled to bus 205 and may be loaded with instruction words from video memory 132 (FIG. 1) via video memory bus 122 and memory interface 250. The purpose of instruction cache 230 is to speed up the execution of certain functions of central processing unit 200. A repetitive function or function that is used often within a particular portion of the program executed by central processing unit 200 may be stored within instruction cache 230. Access to instruction cache 230 via instruction cache bus 204 is much faster than access to video memory 130. Thus, the program executed by central processing unit 200 may be speeded up by preliminarily loading the repeated or often used sequences of instructions within instruction cache 230. Then these instructions may be executed more rapidly because they may be fetched more rapidly. Instruction cache 230 need not always contain the same sets of instructions, but may be loaded with a particular set of instructions which will be often used within a particular portion of the program executed by central processing unit 200.

Host interface 240 is coupled to central processing unit 200 via host interface bus 206. Host interface 240 is further connected to host processing system 110 (FIG. 1) via host system bus 115. Host interface 240 serves to control the communication between host processing system 110 and graphics processor 120. Host interface 240 controls the timing of data transfer between host processing system 110 and graphics processor 120. In this regard, host interface 240 enables either host processing system 110 to interrupt graphics processor 120 or vice versa enabling graphics processor 120 to interrupt host processing system 110. In addition, host interface 240 is coupled to major bus 205 enabling host processing system 110 to control directly the data stored within memory 130. Typically, host interface 240 would communicate graphics requests from host processing system 110 to graphics processor 120, enabling the host system to specify the type of display to be generated by video display 170 and causing graphic processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to bus 205 and further coupled to video memory bus 122. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 122 includes multiplexed address and data information. Memory interface 250 enables graphics processor 120 to provide the proper output on video memory bus 122 at the appropriate time for access to memory 130.

Graphics processor 120 lastly includes input/output registers 260 and video display controller 270. Input/output registers 260 are bidirectionally coupled to bus 205 to enable reading and writing within these registers. Input/output registers 260 are preferably within the ordinary memory space of central processing unit 200. Input/output registers 260 include data which specifies the control parameters of video display controller 270 In accordance with the data stored within input/out registers 260, video display controller 270 generates the signals on video control bus 124 for the desired control of digital to video converter 160. Data within input/output registers 260 includes data for specifying the number of pixels per horizontal line, the horizontal synchronization and blanking intervals, the number of horizontal lines per frame and the vertical synchronization and blanking intervals. Input/output registers 260 may also include data which specifies the type of frame interlace and specifies other types of video control functions. Lastly, input/output registers 260 is a depository for other specific kinds of input and output parameters which will be more fully detailed below.

Graphics processor 120 operates in two differing address modes to address memory 130. These two address modes are x-y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed.

In linear addressing, the start address of a field is formed of a single multibit linear address. The field size is determined by data within a status register within central processing unit 200. In x-y addressing the start address is a pair of x and y coordinate values. The field size is equal to the size of a pixel, that is the number of bits required to specify the particular data at a particular pixel.

FIG. 3 illustrates the arrangement of pixel data in accordance with an x-y addressing mode. Similarly, FIG. 4 illustrates the arrangement of similar data in accordance with the linear addressing mode. FIG. 3 shows origin 310 which serves as the reference point of the x-y matrix of pixels. The origin 310 is specified as an x-y start address and need not be the first address location within memory. The location of data corresponding to an array of pixels, such as a particular defined image element is specified in relation to the origin address 310. This includes an x start address 340 and a y start address 330. Together with the origin, x start address 340 and y start address 330 indicates the starting address of the first pixel data 371 of the particular image desired. The width of the image in pixels is indicated by a quantity delta x 350. The height of the image in pixels is indicated by a quantity delta y 360. In the example illustrated in FIG. 3, the image includes nine pixels labeled 371 through 379. The last parameter necessary to specify the physical address for each of these pixels is the screen pitch 320 which indicates the width of the memory in number of bits. Specification of these parameters namely x starting address 340, y starting address 330, delta x 350, delta y 360 and screen pitch 320 enable memory interface 250 to provide the specified physical address based upon the specified x-y addressing technique.

FIG. 4 similarly illustrates the organization of memory in the linear format. A set of fields 441 to 446, which may be the same as pixels 371 through 376 illustrated in FIG. 3, is illustrated in FIG. 4. The following parameters are necessary to specify the particular elements in accordance with the linear addressing technique. Firstly, is the start address 410 which is the linear start address of the beginning of the first field 441 of the desired array. A second quantity delta x 420 indicates the length of a particular segment of fields in number of bits. A third quantity delta y (not illustrated in FIG. 4) indicates the number of such segments within the particular array. Lastly, linear pitch 430 indicates the difference in linear start address between adjacent array segments. As in the case of x-y addressing, specification of these linear addressing parameters enables memory interface 250 to generate the proper physical address specified.

The two addressing modes are useful for differing purposes. The x-y addressing mode is most useful for that portion of video RAM 132 which includes the bit map data, called the screen memory which is the portion of memory which controls the display. The linear addressing mode is most useful for off screen memory such as for instructions and for image data which is not currently displayed. This latter category includes the various standard symbols such as alphanumeric type fonts and icons which are employed by the computer system. It is sometimes desirable to be able to convert an x-y address to a linear address. This conversion takes place in accordance with the following formula:

$$LA = OFF + (Y \times SP) + (X \times PS)$$

Where: LA is the linear address; OFF is the screen offset, the linear address of the origin of the x-y coordinate system; Y is the y address; SP is the screen pitch in bits; X is the x address; and PS is the pixel size in bits. Regardless of which addressing mode is employed, memory interface 250 generates the proper physical address for access to memory 130.

FIG. 5 illustrates the manner of pixel storage within data words of memory 130. In accordance with one example, memory 130 consists of data words of 16 bits each. These 16 bits are illustrated schematically in FIG. 5 by the hexadecimal digits 0 through F. Each 16 bit word within memory 130 can contain an integral number of such pixels. FIG. 5 illustrates the five available pixel formats corresponding to pixel lengths of 1, 2, 4, 8 and 16 bits. Data word 510 illustrates 16 one bit pixels 511 to 526. Data word 530 illustrates 8 two bit pixels 531 to 538 which are disposed within the 16 bit data word. Data word 540 illustrates 4 four bit pixels 541 to 544 within the 16 bit data word. Data word 550 illustrates 2 eight bit pixels 551 and 552 within the 16 bit word. Lastly, data word 560 illustrates a single 16 bit pixel 561 stored within the 16 bit data word.

FIG. 6 illustrates the contents of some portions of register files 220 which store implied operands for various graphics instructions. Each of the registers 601 through 611 illustrated in FIG. 6 are within the register address space of central processing unit 200 of graphics processor 120. Note, these register files illustrated in FIG. 6 are not intended to include all the possible registers within register files 220. On the contrary, a typical system will include numerous general purpose undesignated registers which can be employed by central processing unit 200 for a variety of program specified functions.

Register 601 stores the source address. This is the address of the lower left corner of the source array. This source address is the combination of x address 340 and y address 330 in the x-y addressing mode or the linear start address 410 in the linear addressing mode.

Register 602 stores the source pitch or the difference in linear start addresses between adjacent rows of the source array. This is either screen pitch 320 illustrated in FIG. 3 or linear pitch 430 illustrated in FIG. 4 depending upon whether the x-y addressing format or the linear addressing format is employed.

Registers 603 and 604 are similar to registers 601 and 602, respectively, except that these registers include the destination start address and the destination pitch. The destination address stored in register 603 is the address of the lower left hand corner of the destination array in either x-y addressing mode or linear addressing mode. Similarly, the destination pitch stored in register 604 is the difference in linear starting address of adjacent rows, that is either screen pitch 320 or linear pitch 430 dependent upon the addressing mode selected.

Register 605 stores the offset. The offset is the linear bit address corresponding to the origin of the coordinates of the x-y address scheme. As mentioned above, the origin 310 of the x-y address system does not necessarily belong to the physical starting address of the memory. The offset stored in register 605 is the linear start address of the origin 310 of this x-y coordinate system. This offset is employed to convert between linear and x-y addressing.

Registers 606 and 607 store addresses corresponding to a window within the screen memory. The window start stored in register 606 is the x-y address of the lower left hand corner of a display window. Similarly, register 607 stores the window end which is the x-y address of the upper right hand corner of this display window. The addresses within these two registers are employed to determine the boundaries of the specified display window. In accordance with the well known graphics techniques, images within a window within the graphics display may differ from the images of the background. The window start and window end addresses contained in these registers are employed to designate the extent of the window in order to permit graphics processor 120 to determine whether a particular x-y address is inside or outside of the window.

Register 608 stores the delta y/delta x data. This register is divided into two independent halves, the upper half (higher order bits) designating the height of the source array (delta y) and the lower half (lower order bits) designating the width of the source array (delta x). The delta y/delta x data stored in register 608 may be provided in either the x-y addressing format or in the linear addressing format depending upon the manner in which the source array is designated. The meaning of the two quantities delta x and delta y are discussed above in conjunction with FIGS. 3 and 4.

Registers 609 and 610 each contain pixel data. Color 0 data stored in register 609 contains a pixel value replicated throughout the register corresponding to a first color designated color 0. Similarly, color 1 data stored in register 610 includes a pixel value replicated throughout the register corresponding to a second color value designated color 1. Certain of the graphics instructions of graphics processor 120 employ either or both of these color values within their data manipulation. The use of these registers will be explained further below.

Lastly, the register file 220 includes register 611 which stores the stack pointer address. The stack pointer address stored in register 611 specifies the bit address within video RAM 132 which is the top of the data stack. This value is adjusted as data is pushed onto the data stack or popped from the data stack. This stack pointer address thus serves to indicate the address of the last entered data in the data stack.

FIG. 7 illustrates in schematic form the process of an array move from off screen memory to screen memory. FIG. 7 illustrates video RAM 132 which includes screen memory 705 and off screen memory 715. In FIG. 7 an array of pixels 780 (or more precisely the data corresponding to an array of pixels) is transferred from off screen memory 715 to screen memory 705 becoming an array of pixels 790.

Prior to the performing the array move operation, certain data must be stored in the designated registers of register files 220. Register 601 must be loaded with the beginning address 710 of the source array of pixels. In the example illustrated in FIG. 7, this is designated in linear addressing mode. The source pitch 720 is stored in register 602 Register 603 is loaded with the destination address. In the example illustrated in FIG. 7, this is designated in x-y addressing mode including x address 730 and y address 740. Register 604 has the destination pitch 745 stored therein. The linear address of the origin of the x-y coordinate system, offset address 770, is stored in register 605. Lastly, delta y 750 and delta x 760 are stored in separate halves of register 608.

The array move operation illustrated schematically in FIG. 7 is executed in conjunction with the data stored in these registers of register file 220. In accordance with one example, the number of bits per pixel is selected so that an integral number of pixels are stored in a single physical data word. By this choice, the graphics processor may transfer the array of pixels 80 to the array of pixels 790 largely by transfer of whole data words. Even with this selection of the number of bits per pixel in relation to the number of bits per physical data word, it is still necessary to deal with partial words at the array boundaries in some cases. However, this design choice serves to minimize the need to access and transfer partial data words.

The pixel data from the corresponding address locations of the source image and the destination image are combined in a manner designated by the instruction. The combination of data may be a logical function (such as AND or OR) or it may be an arithmetic function (such as addition or subtraction). The new data thus stored in the array of pixels 790 is a function of both the data of the array of pixels 780 and the current data of pixels 790. The data transfer illustrated in FIG. 7 is only a special case of this more general data transformation in which the data finally stored in the destination array does not depend upon the data previously stored there.

This process is illustrated by the flow chart 800 in FIG. 8. In accordance with one example, the transfer takes place sequentially by physical data words. Once the process begins, the data stored in register 601 is read to obtain the source address (processing block 802). Next graphics processor 120 fetches the indicated physical data word from memory 130 corresponding to the indicated source address (processing block 803). In the case that the source address is specified in the x-y format, this recall of data would include the steps of converting the x-y address into the corresponding physical address. A similar process of recall of the destination address from register 603 (processing block 804) and then fetching of the indicated physical data word (processing block 805) takes place for the data contained at the destination location.

This combined data is then restored in the destination location previously determined (processing block 806). The source and destination pixel data are then combined in accordance with the combination mode designated by the particular data transfer instruction being executed. This is performed on a pixel by pixel basis even if the physical data word includes data corresponding to more than one pixel. This combined data is then written into the specified destination location (processing block 807).

In conjunction with the delta y/delta x information stored in register 608, graphics processor 120 determines whether or not the entire data transfer has taken place (decision block 808) by detecting whether the last data has been transferred. If the entire data transfer has not been performed, then the source address is updated. In conjunction with the source address previously stored in register 601 and the source pitch data stored in register 602, the source address stored in register 601 is updated to refer to the next data word to be transferred (processing block 809). Similarly, the destination address stored in register 603 is updated in conjunction with the destination pitch data stored in register 604 to refer to the next data word in the destination (processing block 810). This process is repeated using the new source stored in register 601 and the new destination data stored in register 603.

As noted above, the delta y/delta x data stored in register 608 is used to define the limits of the image to be transferred. When the entire image has been transferred as indicated with reference to the delta y/delta x data stored in register 608 (decision block 808), then the instruction execution is complete (end block 811) and graphics processor 120 continues by executing the next instruction in its program. As noted in the example and as illustrated in FIG. D the process is implemented in instruction microcode and the entire data transformation process, referred to as an array move, is performed in response to a single instruction to graphics processor 120.

Figure 9:
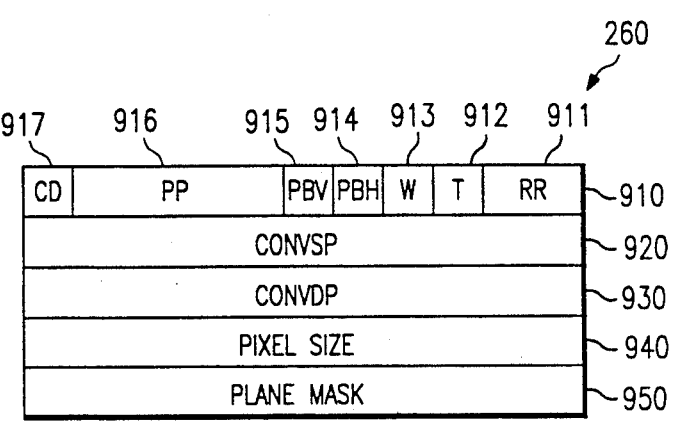
FIG. 9 illustrates some of the input/output registers of the graphics data processor of the present invention.

FIG. 9 illustrates a portion of input/output register 260 which is employed to store data relevant to the transparency operations. Firstly, input/output registers 260 includes a register 910 which stores a control word. This control word is used to specify types of operations performed by central processing unit 210. The control word stored in register 910 includes a refresh rate section 911, transparency enable/disable section 912, a windowing option section 913, a pixel block horizontal direction control section 914, a pixel block transfer vertical direction control section 915, a pixel processing section 916 and a cache enable/disable section 917. The purpose and effect of these sections of the control word will be described below.

Control register 910 includes a window violation control portion 913. This window violation control portion preferably includes two bits. Depending upon the state of these two bits graphics processor 120 performs differing windowing functions. These differing windowing functions are implied in the case of an array move such as illustrated in FIG. 9. If these two windowing function bits are "00", then no windowing takes place If these windowing violation bits are "10," then an interrupt is generated if a window violation occurs. In this case, the source pixel is moved to its destination only if it lies within the window defined by the window start and window end data stored within register files 220. If the destination is outside of the window, then an interrupt is generated and the array move is aborted. Lastly, if the window violation bits are "11," then a windowed move occurs. The source pixel is moved only if its destination lies within the window. If the destination lies outside the window, then that particular pixel move is aborted. However, other pixels within the same array move will be transferred normally, if their destinations are within the window. Thus, in the array move, the destination is truncated to fit within the window and only those pixels within the window are transferred. Table 2 is a summary of the window violation control codes.

TABLE 1

| W Bits | | Windowing Action |
|---|---|---|
| 0 | 0 | Windowing Disabled |
| 0 | 1 | Unused |
| 1 | 0 | Interrupt on Window Violation |
| 1 | 1 | Inhibit Pixel Write on Window Violation Other Pixels Unaffected |

Register 910 includes sections 914 and 915 which indicate the direction of movement of the pixel block transfer operation. Section 914 stores the pixel block transfer horizontal control bit (PBH) which sets the direction of horizontal movement. If the pixel block transfer horizontal control bit is "0", then the x coordinate is incremented. This corresponds to movement from left to right. If the pixel block transfer horizontal control bit is "1", then the x coordinate is decremented causing movement from right to left. Section 915 stores the pixel block transfer vertical control bit (PBV) which indicates the direction of vertical movement. This is defined similarly to the horizontal control. A "0" causes the y coordinate to be incremented causing movement from top to bottom. A "1" causes the y coordinate to be decremented causing movement from bottom to top.

Pixel processing section 916 within the control word stored in register 910 specifies the type of source destination combination performed during array moves. As noted in regard to FIG. 9, and in particular to processing block 806, this combination of source and pixel data may include various logic and arithmetic functions.

The last section of register 910 stores the cache enable/disable bit 917. If this bit is "0", then the instruction cache 230 is enabled. If an instruction is already loaded in the cache, then it is executed from the cache without reading the requested instruction from memory 130. If the instruction is not in the cache, then that instruction together with the next three instructions are fetched from memory 130 and stored in instruction cache 230. This operation is controlled by memory interface 250 and occurs without the direct control of central processing unit 200. On the other hand, if the cache enable/disable bit is "1", then the instruction cache is disabled. In that case, each requested instruction is individually recalled from memory 130 when requested.

Registers 920 and 930 are employed to store data which is useful in converting between x-y and liner addresses. CONVSP data stored in register 920 is a precalculated factor employed to enable conversion from x-y addressing to linear addressing for screen pitch. This factor is:

$$16 + \log_2 (\text{screen pitch})$$

In a similar fashion, the data CONVLP stored in register 930 is employed for conversion between x-y addressing and linear addressing for the linear pitch. This data corresponds to:
ti $16 + \log_2$ (linear pitch)

Storing this data in registers 920 and 930 in this manner enables central processing unit 200 to readily access this data in order to quickly implement the conversions between x-y addressing and linear addressing.

Register 940 has the pixel size data stored therein. The pixel size data indicates the number of bits per pixel within the displayable portion of video RAM 132. Register 940 stores pixel size data which equals the number of bits per word selected. Thus, if a single bit per word has been selected, register 940 stores the numerical data 1. Similarly, if two-bit per pixel has been selected, then register 940 stores numerical data equal to 2. Likewise, other possible numbers of bits per pixel are indicated by the numeric values stored within register 940. This pixel size data is employed by CPU 200 and special graphics hardware 210 in executing various instructions, in particular, the transparency operation to be discussed further below.

Register 950 stores a plane priority mask which is employed in raster operations. Register 950 stores a bit mask which defines which portions of each pixel color code are to be actively modified during an array move operation such as illustrated in FIG. 9. In accordance with the example, register 910 includes the plane mask, which is equal in length to the pixel size, replicated throughout the register. In the plane mask "1", bits correspond to bits within the pixel color code which are to be written into the destination location and "0" bits correspond to bits which are to be unchanged in the destination location. This permits only part of the pixel color code to be modified by a raster operation. This feature is useful when the pixel color codes represent a number of separable attributes, such as red, blue and green color intensities. Plane masking can be disabled by setting register 950 to all "1's", thereby assuring that all pixels of the destination are affected.

Figure 10:
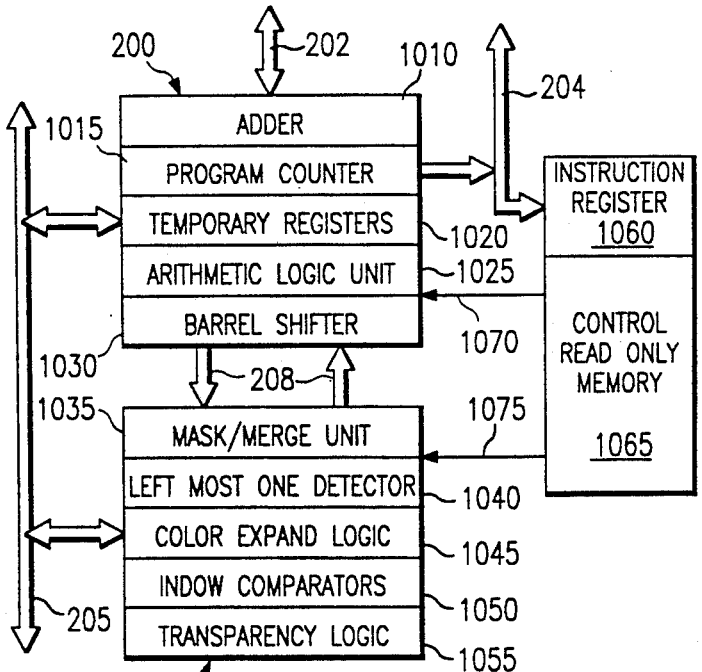
FIG. 10 illustrates further details of the central processing unit and the special graphics hardware of the graphics data processor of the present invention.

FIG. 10 illustrates in somewhat greater detail the structure and interrelationship between central processing unit 200 and special graphics hardware 210. As previously illustrated in FIG. 2, central processing unit 200 and special graphics hardware 210 are bidirectionally coupled via bus 208. Central processing unit 200 and special graphics hardware 210 are bidirectionally coupled to major bus 205. In addition, FIG. 10 illustrates central processing unit 200 connected to bus 202, which is further coupled to the register files 220 and to bus 204 which is further coupled to instruction cache 230.

FIG. 10 illustrates that central processing unit 200 includes adder 1010, program counter 1015, temporary registers 1020, arithmetic logic unit 1025 and barrel shifter 1030. These elements are conventional in character, corresponding to elements employed in central processing units known in the prior art.

FIG. 10 illustrates various subparts of special graphics hardware 210. Special graphics hardware 210 includes mask/merge unit 1035, leftmost one detector 1040, color expand logic 1045, window comparators 1050 and transparency logic 2055. These individual portions of special graphics hardware 210 are particularly adapted for manipulation of pixel information within video random access memory 132. The operation of each of these units will be more fully described below.

FIG. 10 also illustrates instruction register 1060 and control read only memory 1065. Instruction register 1060 receives an instruction from instruction cache 230 via bus 204. The particular instruction recalled for storage in instruction register 1060 is specified by the address stored in program counter 1015. Whether this instruction must be recalled from memory 130 via memory interface 250, or it is already stored within instruction cache 230, this instruction is stored in the instruction register 1060. The instruction stored in instruction 1060 activates control read only memory 1065 to output a plurality of control signals corresponding to the particular instruction being executed. Thus, control read only memory 1065 performs the function of an instruction decoder. The control signals are applied to central processing unit 200 via control bus 1070 and to special graphics hardware 210 via control bus 1075. It is contemplated that some instructions which may be stored in instruction register 1060 for implementation via control read only 1065, may require only some of the resources of central processing unit 200 or special graphics hardware 210. However, no distinction is made in the instruction itself or in the control signals stored within control read only memory 1065. When an instruction is received by graphics processor 120, it is loaded into instruction register 1060 for implementation via control signals on control buses 1070 and 1075 derived from control read only memory 1065. It is contemplated that in some cases, cooperation between central processing unit 200 and special graphics hardware 210 will be required in order to implement a single instruction. This is to be expected in the same manner in which several portions of central processing unit 200 would ordinarily be required to implement any instruction directed solely to the resources of central processing unit 200.

FIG. 11 shows a reiteration of FIG. 1 in a more stylized format showing the banks of the VRAM for pixel storage.

Figure 12:
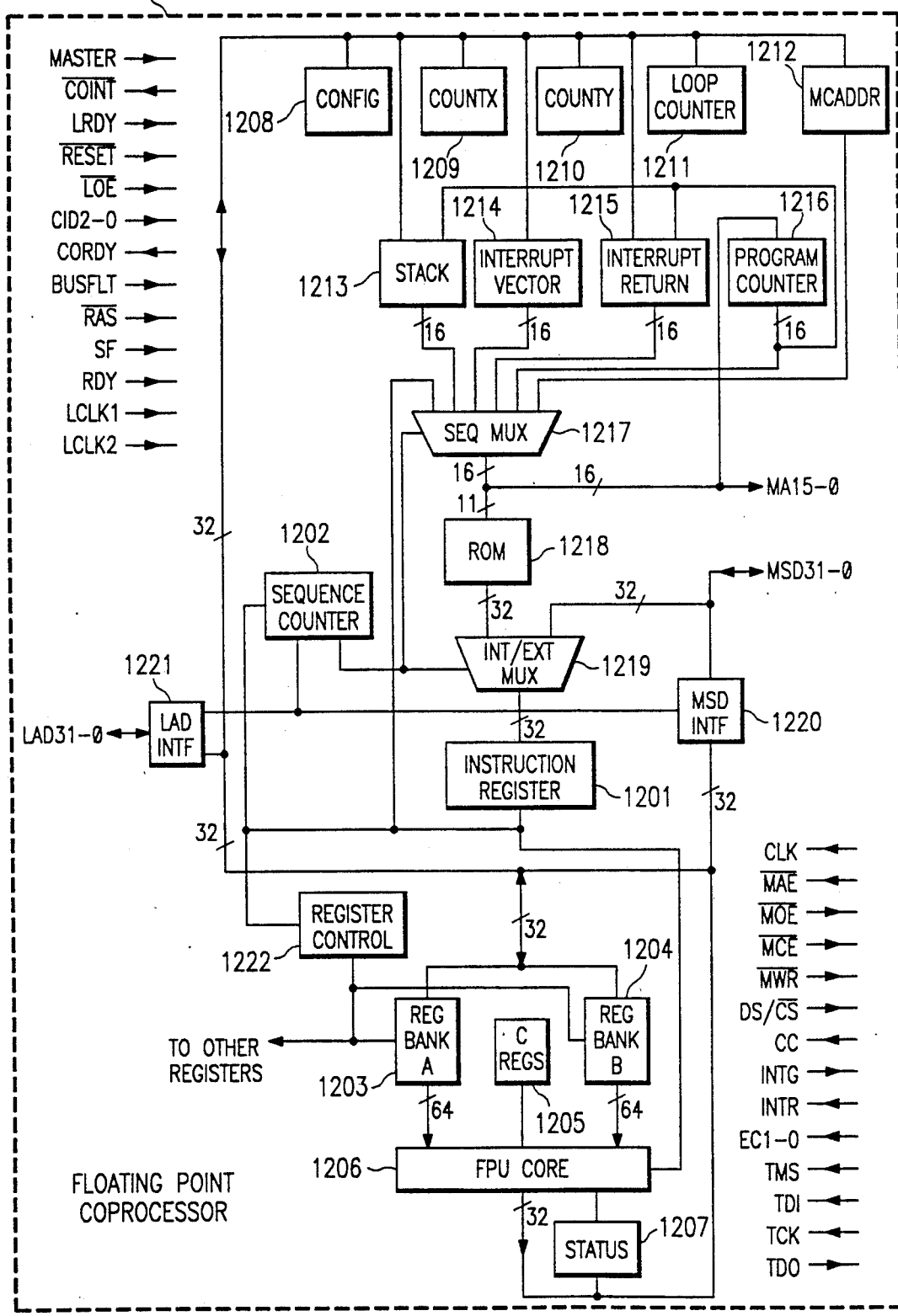
FIG. 12 shows details of a schematic layout of the floating point coprocessor.

Continuing now with FIG. 12, the main processor sends a command to coprocessor 1200 using the LAD bus. The 32 command bits (0-31) transferred on the LAD bus are broken up into instruction fields that allow for specific controlled operations of the coprocessor. The information comes in on the LAD bus and is placed in instruction register 1201, which decodes the instruction and passes the information to sequence controller 1202, which then sequences through the various operations that are needed to perform any of the instructions. This is the same operation for add, subtract, divide and multiply instructions or for the graphics instructions, such as the backface test or clipping of a polygon or any of the matrix or vector operations.

The source of the data from the operations also comes in over the LAD bus and is passed to register (1203) in the register A bank or to registers 1204 in the register B bank The data may also be transferred through the FPC to the coprocessor local memory. The received instruction indicates to the coprocessor what should occur, and the coprocessor performs the operations and then leaves the results in either register bank A or register bank B in local memory. The host processor can then poll the coprocessor, that is, read a status that determines that the coprocessor has finished with the particular operation and that the data is available to be read. The coprocessor can send an interrupt to the host processor over the COINT pin.

The instructions are actually executed in FPU core 1206, which consists of a floating point Arithmetic Logic Unit ALU and a floating point multiplier. The two units can operate simultaneously so that, within the coprocessor, a floating point ADD and a floating point MULTIPLY can be occurring simultaneously.

Status register 1207 maintains the status of the results of any given operations and can be used to determine whether any overflows or error conditions occurred in the execution of an instruction.

Configuration register 1208 is written with specific values to set up the floating point coprocessor for the types of data that will be operated on, what conditions will be used, rounding modes, and so forth. Count X 1209 and count Y 1210 registers are used in the MIN MAX instructions to maintain a count of what values are the current minimum and maximum values being processed by those specific instructions. Loop counter 1211 allows a series of instructions to be operated upon a specified number of times. Microcode address register 1212 is used as an indirect address to any external memory 1108 attached to the coprocessor. Such a memory would be accessed using the MA 15 through 0 lines, and any data or programs that are stored externally would be accessed over the MSD 31 through 0 lines.

Stack 1213 provides a two deep subroutine stack to hold the contents of the instruction register and is primarily used in calls to subroutines Interrupt vector register 1214 stores the address of an external memory location that would be branched to in the event that an external interrupt were generated. Interrupt return register 1215 is a temporary storage for the return from an interrupt so that when program flow is broken by an intempt, the address of the next sequential instruction in the flow may be saved Program counter 1216 keeps track of where in any program sequence the processor is in its execution, and forms the general instruction pointer, pointing to the next instruction to be executed.

Sequencer-multiplexer 1217 determines what address source (program counter interrupt return, interrupt vector, stack or address from the instruction register) will be placed onto the MA 15 through 0 lines. ROM 1218 also is used to decode addresses and is used to generate data patterns that would be output from the MSD 31 through 0 lines. Internal-external multiplexer 1219 determines whether the data is being read from one of the internal locations or from the external MSD lines. MSD 1220 interface allows data going to FPU core register banks 1203 or 1204 to either come from the MSD bus or from the LAD bus.

VECTOR INSTRUCTIONS

One of the chief problems in three-dimensional shaded graphics representations is a problem that resolves into vector operations to determine where light rays would hit a given surface and how the rays would scatter. In order to quickly generate results, it is necessary to be able to do vector operations quickly. A series of vector primitives were developed, including the vector add, which adds two vectors, the vector subtract, the vector dot product, which performs a scalar dot product of two vectors, a vector cross product, which generates the cross product, the vector magnitude, which determines the absolute magnitude of a given vector and then an instruction to normalize a vector to a unit magnitude but preserving its direction. There is also an instruction for generating the reflection of a vector. This instruction is called the vector reflect instruction. These instructions are used to generate the data that is required to perform various shading and highlighting of graphical images represented in 3-D images.

The vector instructions comprise the subset of the instructions on coprocessor 1200 that allow vector operations to be effectively performed with a minimum of data flow between the host processor and the coprocessor. These instructions are generalized into the basic addition and subtraction and operations on vector quantities. In doing the vector instructions, the vector data comes in, as discussed above with respect to FIG. 12, on LAD interface 1221, and the first vector is placed into register bank A 1203. The subsequent or second vector is then placed into register bank B 1204. The instruction to perform the specific operation on those two vectors is then transferred through LAD interface 1221 to provide the instruction to instruction register 1201, which, in turn, generates the sequence in the sequence control 1202 to take the data from the register banks and perform the addition or subtraction of the element of those vector in FPU core 1206.

The result vector is then returned to the A register bank in the case of the vector add and vector subtract operations, so that the resulting vector is then ready to be operated on by any subsequent instructions that might be sent for that particular vector.

In the case of vector dot product, the two vectors again are stored in register banks A and B. The operations to perform the scalar dot product are performed in FPU 1206 under the control of sequencer 1202. The result is placed into C registers 1205. The cross product would take two vectors in register banks A and B and generate a resulting cross product vector, again, using the sequencer to generate the control sequence in FPU core 1206 to do the actual multiplications and subtractions that are required. The result is then placed in register bank A 1203. For the vector magnitude instruction, the magnitude of a vector stored in the A register file is placed into the C register 1205.

In doing the vector normalization, a vector that has been placed in register bank A is normalized using FPU core 1206 instructions, taking the square root and then dividing by the relative length of the vector. The resulting normalized vector stored is then returned to a register in the A bank.

GRAPHICS, IMAGING AND MATRIX INSTRUCTIONS

Graphic images are composed of polygons, and those polygons are represented by their vertices. In order to map those polygons into a viewable image, they go through a series of matrix operations. So the first thing we must discuss with respect to graphics processing is matrix operations. First, you compose a 4×4 matrix that comprises the X, Y, Z and what is known as the W values for a given image.

Figure 13:
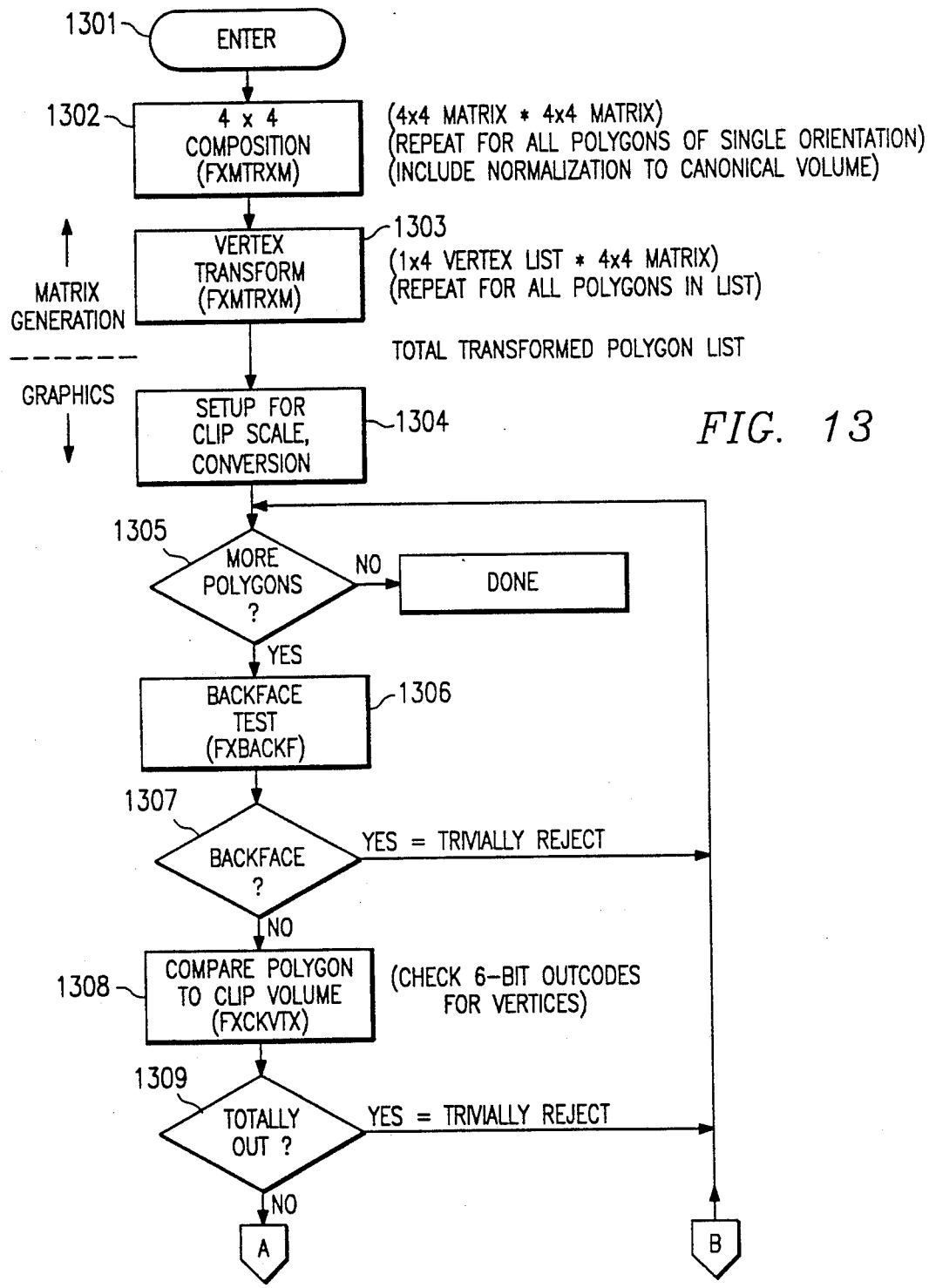
FIGS. 13, 14 and 15 show flow charts of some of the graphic, mathematical and image processing operations.

As shown in FIG. 13, in the graphics flow chart, you enter box 1301 and perform a series of operations 1302 to compose a 4×4 matrix. The set of instructions that perform this operation are known as the FXMTRXn instructions, where N is from 0 to 3. The instructions are used to build a 4×4 composite matrix from a set of 4×4 matrices. Then each of the vertices in a polygon list are transformed. This determines where the particular polygon will be represented in the final display.

It should be noted here that a full description of each of these instructions, as well as others, and the loading of each of the output and input registers is shown in the afore-mentioned TMS 34082 specifications. Some of these instructions and their register contents are shown at the end of this specification.

Once all the polygons have been taken through this transformation process, the transformed polygons are tested as to their position relative to the current view area. For graphics, as shown in routine 1304, the clip, scale and conversion parameters are established. The processor then begins the determines, box 1305, if there are any more polygons to be tested. If there are, then it tests, box 1306, to determine if that polygon is facing away or toward the observer. If it is facing away from the observer, that is called a backface; it would not be viewed, and so it can be rejected from further analysis. The backface instruction FYBACKF makes that determination on the polygon. This is done by inputting 3 vertices of the polygon and determining the rotation orientation.

Given 3 vertices $V_1 = X_1 \ Y_1 \ Z_1 \ W_1$
$V_2 = X_2 \ Y_2 \ Z_2 \ W_2$
$V_3 = X_3 \ Y_3 \ Z_3 \ W_3$ If $[((X_2 * Y_0) - (X_0 * Y_2))W_1 + ((X_0 * W_2) - (X_2 * W_0))Y_1 +$ -continued
$((Y_2 * W_0) - (Y_0 * W_2))X_1] < 0$ then the polygon is backward facing. If the [quantity]=0, then the polygon is parallel to the view and may be rejected from further calculations.

FIG. 16 shows a clockwise or forward facing polygon; FIG. 17 shows a counterclockwise polygon or rearward (back) facing polygon, while FIG. 18 shows a polygon parallel to the current view. For a forward-facing polygon, the polygon is compared to the clipping volume, as shown in box 1305, using instruction FXCKVTX to determine if it can be represented within the current viewing region. In order to make such a determination, the system checks all the vertices of the polygon to see if the polygon crosses a boundary established by 6 (six) bounding planes. This is accomplished by checking a vertex V against X, Y, Z and W as follows:

If $(|w| - |x|) < 0$ then point is outside ±x boundary
If $(|w| - |y|) < 0$ then point is outside ±y boundary
If $(|w| - |z|) < 0$ then point is outside ±z boundary Status is set such that after all of vertices of a polygon are run through this instruction, determination can be made as to whether the polygon is totally within, totally outside, or crosses the current viewing volume.

Figure 14:
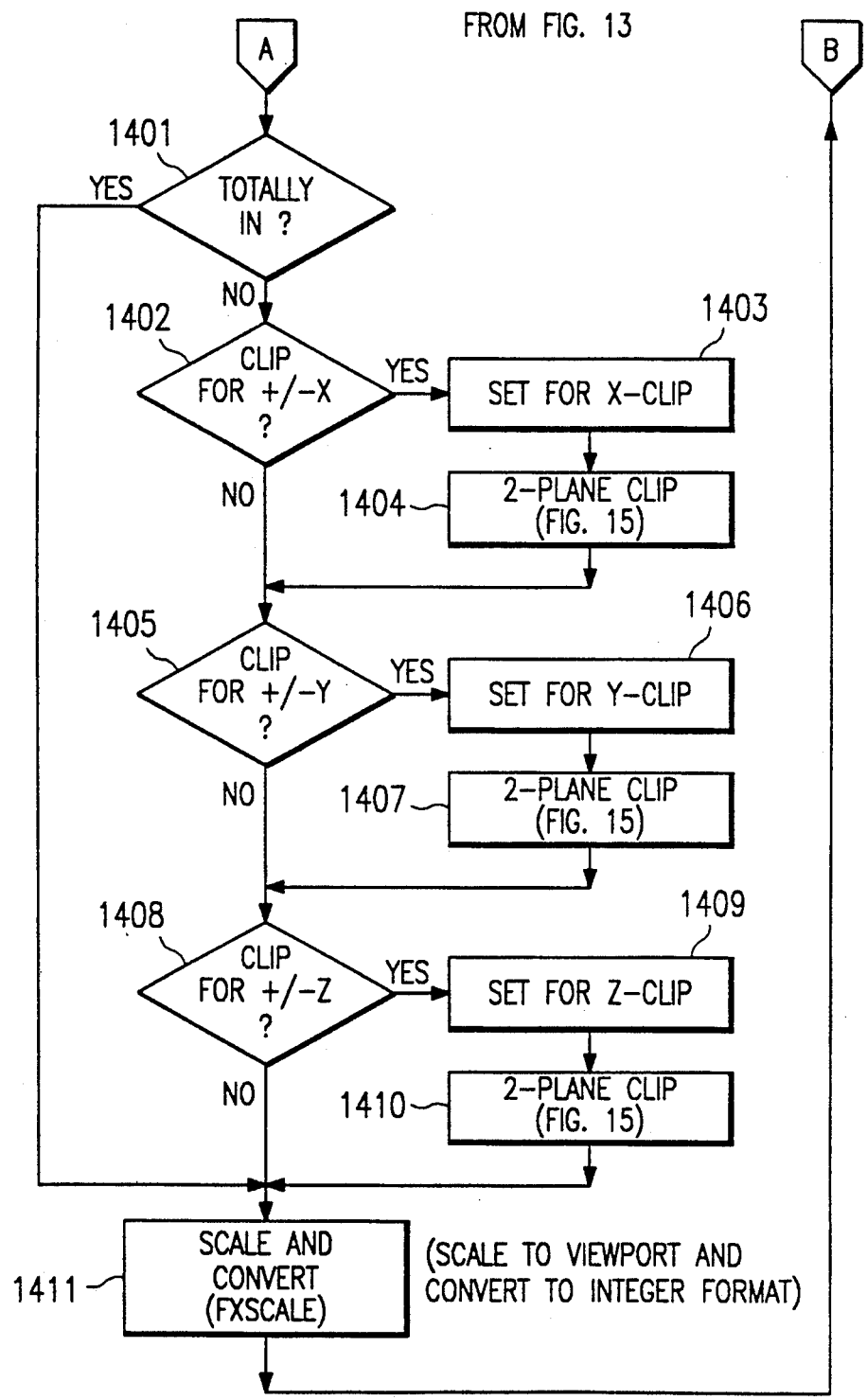

Based upon the result of checking all vertices of the polygon, the polygon can be determined to be totally outside the viewing window box 1309, and trivially rejected. If not, then it must be decided if it is totally within the viewing window, FIG. 14, box 1401. In this situation, the polygon must be scaled and converted as shown in FIG. 14, box 1411, using instruction FxSCALE which converts graphical points to the co-ordinate scale of the current viewport.

For point Xi Yi Zi Wi $$x_i = \left(\frac{xi}{wi}\right)Sx + Cx$$

$$y_i = \left(\frac{yi}{wi}\right)Sy + Cy$$

$$z_i = \left(\frac{zi}{wi}\right)Sz + Cz$$

where Sx, Sy and Sz are the scaling factors for the viewpoint and Cx, Cy Cz are the offsets to the center of the viewport.

If, however, the polygon is not totally in the viewing area, but one or more of its edges crosses the viewing boundary, then the polygon must be clipped to the viewing boundary. The processor then uses the general clipping process and determines if it should clip to the X plane pair, box 1402, or clip to the Y plane pair, box 1405, or clip to the Z plane pair, 1408.

For each of these choices, the coprocessor would go into the 2-plane polygon clip, which is a process that allows, the polygon to be compared to two planes in a single pass through the algorithm. Typically, in most graphics algorithms, six passes are required, one for each plane of a bounding box. This system has a method that allows for three passes to minimize the data flow. The system checks two planes at a time, the ±X, then the ±Y and ±Z planes.

Figure 15:
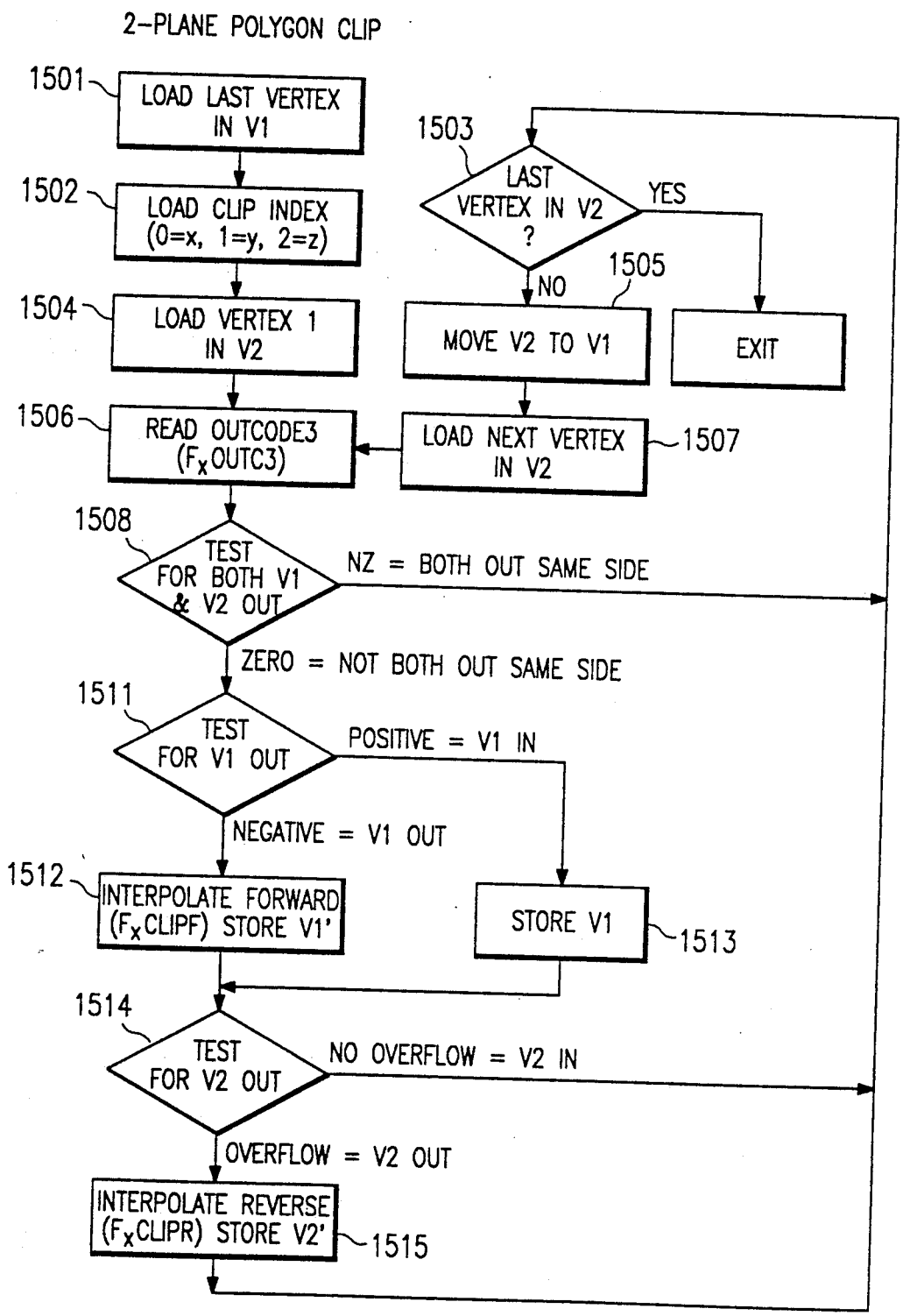

As shown in FIG. 15, box 1502, the index of the pairs to be checked are loaded together with the vertices, box 1504, of the polygon into the coprocessor to determine if that particular vertex is outside of the clipping volume, box 1506. If it is out, then a determination is made, box 1508, if two vertices of the polygon are out, and if they are both out on the same side of the clipping volume. If they are not both out on the same side, then the coprocessor tests for one vertex out, box 1511, and if it is, then the clip forward instruction is invoked. If the second vertex is out, box 1514, the clip reverse instruction is invoked.

FIG. 19 shows a viewing area 1900 having X, Y and Z planes. A line P1-P2 passes through the viewing area and a determination must be made as to the points P1' and P2' that define the line segment between P1 and P2 that is contained within the viewing area. Starting from point P, the point P1' is determined (clip forward) and starting from point P2, the point P2' is determined (clip reverse). These two points determine the line segment P1'-P2' and are based on the limits of the clipping volumes determined by the X, Y and Z coordinates.

The processor then checks to see if the last vertex of the polygon has been tested, box 1503, FIG. 15; if it is not the last, then the next vertex is loaded so that the clipping process will continue with the next vertex in the polygon list.

VECTOR MATHEMATICS

A vector is a directed line segment (magnitude and direction) and can be represented using the unit vectors i, j and k that point in the positive direction of each of the 3 coordinate axes. Thus, any vector V can be written as $v_1 i + v_2 j + v_3 k$.

With respect to FIG. 20, in order to add vectors AB+CD, place vector CD so that C falls on the end point B of vector AB. the sum vector AB+CD is then the vector AD. Based on the above notion, then:

vector $E = e_1 i + e_2 j + e_2 k$ vector $F = f_1 i + f_2 j + f_3 h$ and vector $E + F = (e_1 + f_1)i + (e_2 + f_2)j + (e_3 + f_3)k$ To subtract vector DC from vector AB, add the vector DC [−DC=CD] to vector AB. Using FIG. 20, then vector AB−vector DC=vector AB+vector CD=vector AD.

The scalar dot product A·B of two vectors A and B is the product of their lengths and the cosine of the angle between them.

For vector $A = a_1 i + a_2 j + a_3 k$ and vector $B = b_1 i + b_2 j + b_3 k$

The scalar dot product $A \cdot B = a_1 b_1 + a_2 b_2 + a_3 b_3$

The vector cross product $A \times B$ of two vectors A and B is a vector of length $|A| \cdot |B| \sin \theta$, perpendicular to the plane of A and B and such that A, B and $A \times B$ form a right handed set.

$$A \times B = |A||B| \sin \theta \, e$$

where e is a unit vector perpendicular to the plane of A and B and such that A, B, and e form a right handed set.

$$A \times B = (a_2 b_3 - a_3 b_2)i + (a_3 b_1 - a_1 b_3)j + (a_1 b_2 - a_2 b_1)k$$

The vector magnitude for VECTOR $A = a_1 i + a_2 j + a_3 k$ is: $A = (a_1 * a) + (a_2 * a_2) + (a_3 * a_3)$. The vector normalization or $A = a_1 i + a_2 j + a_3 k$ is:

$$\frac{a_1}{(a_1)^2 + (a_2)^2 + (a_3)^2} i + \frac{a_2}{(a_1)^2 + (a_2)^2 + (a_3)^2} j + \frac{a_3}{(a_1)^2 + (a_2)^2 + (a_3)^2} k$$

To multiply a vector $A = a_1 i + a_2 j + a_3 k$, by a scalar value S is given as:

$$S(A) = (S*a_1)i + (S*a_2)j + (S*a_3)k$$

Reflecting a vector L about vector N to form vector R is shown in FIG. 21, where:

$L = l_1 i + l_2 j + l_3 k$ $N = n_1 i + n_2 j + n_3 k$ $R = r_1 i + r_2 j + r_3 k$

Then given L and N, find R $$\begin{aligned}\cos \theta &= L \cdot N \\ &= (l_1 n_1) + (l_2 n_2) + (l_3 n_3)\end{aligned}$$

$r_x = 2n_1 \cos \theta - l_1$ $r_y = 2n_2 \cos \theta - l_2$ $r_z = 2n_3 \cos \theta - l_3$

Matrix Instructions

A rectangular array of numbers is called a matrix.

$$\text{Let matrix } [A] = \begin{vmatrix} a00 & a01 & a02 & a03 \\ a10 & a11 & a12 & a13 \\ a20 & a21 & a22 & a23 \\ a30 & a31 & a32 & a33 \end{vmatrix}$$

$$\text{and matrix } [B] = \begin{vmatrix} b00 & b01 & b02 & b03 \\ b10 & b11 & b12 & b13 \\ b20 & b21 & b22 & b23 \\ b30 & b31 & b32 & b33 \end{vmatrix}$$

$$\text{and matrix } [C] = \begin{vmatrix} c00 & c01 & c02 & c03 \\ c10 & c11 & c12 & c13 \\ c20 & c21 & c22 & c23 \\ c30 & c31 & c32 & c33 \end{vmatrix}$$

then $[A] * [B] = [C]$ where c00 = (a00 * b00) + (a01 * b10) + (a02 * b20) + (a03 * b30)
c01 = (a00 * b01) + (a01 * b11) + (a02 * b21) + (a03 * b31)
c02 = (a00 * b02) + (a01 * b12) + (a02 * b22) + (a03 * b32)
c03 = (a00 * b03) + (a01 * b13) + (a02 * b23) + (a03 * b33)

c10 = (a10 * b00) + (a11 * b10) + (a12 * b20) + (a13 * b30)
c11 = (a10 * b01) + (a11 * b11) + (a12 * b21) + (a13 * b31)
c12 = (a10 * b02) + (a11 * b12) + (a12 * b22) + (a13 * b32)
c13 = (a10 * b03) + (a11 * b13) + (a12 * b23) + (a13 * b33)

c20 = (a20 * b00) + (a21 * b10) + (a22 * b20) + (a23 * b30)
c21 = (a20 * b01) + (a21 * b11) + (a22 * b21) + (a23 * b31)
c22 = (a20 * b02) + (a21 * b12) + (a22 * b22) + (a23 * b32)
c23 = (a20 * b03) + (a21 * b13) + (a22 * b23) + (a23 * b33)

c30 = (a30 * b00) + (a31 * b10) + (a32 * b20) + (a33 * b30)
c31 = (a30 * b01) + (a31 * b11) + (a32 * b21) + (a33 * b31)
c32 = (a30 * b02) + (a31 * b12) + (a32 * b22) + (a33 * b32)

-continued
$$c33 = (a30 * b03) + (a31 * b13) + (a32 * b23) + (a33 * b33)$$

which requires 64 multiples and 48 adds.

The FxMTRx0 instruction performs:

$$c_{x0} = a_{x0} \times b_{00}$$

$$c_{x1} = a_{x0} \times b_{01}$$

$$c_{x2} = a_{x0} \times b_{02}$$

$$c_{x3} = a_{x0} \times b_{03}$$

SAMPLE INSTRUCTION SET

The following set of instructions includes a partial listing of instructions for one graphics coprocessor currently available, namely Texas Instruments TMS 34082 graphics coprocessor. An understanding of each of these instructions is not necessary for an understanding of the inventive concepts of this invention. They are being provided here as an aid to constructing and using one particular system.

The FxMTRx1 instruction performs:

$$c_{x0} = c_{x0} + (a_{x1} * b_{10})$$

$$c_{x1} = c_{x1} + (a_{x1} * b_{11})$$

$$c_{x2} = c_{x2} + (a_{x1} * b_{12})$$

$$c_{x3} = c_{x3} + (a_{x1} * b_{13})$$

The FxMTRx2 instruction performs:

$$c_{x0} = c_{x0} + (a_{x2} * b_{20})$$

$$c_{x1} = c_{x1} + (a_{x2} * b_{21})$$

$$c_{x2} = c_{x2} + (a_{x2} * b_{22})$$

$$c_{x3} = c_{x3} + (a_{x2} * b_{23})$$

The FxMTRx3 instruction performs:

$$c_{x0} = c_{x0} + (a_{x3} * b_{30})$$

$$c_{x1} = c_{x1} + (a_{x3} * b_{31})$$

$$c_{x2} = c_{x2} + (a_{x3} * b_{32})$$

$$c_{x3} = c_{x3} + (a_{x3} * b_{33})$$

These have been some of the basic calculations performed by the coprocessor, all operating under control of the coprocessor from primitive instructions residing in the coprocessor. As can be appreciated, numerous repetitive calculations must be performed in a short period of time, and the results used for controlling a next set of calculations. This has been accomplished.

Although the present invention has been described with respect to a specific preferred embodiment thereof, various changes and modifications may be suggested by one skilled in the art, and it is intended that the present invention encompass such changes and modifications as fall within the scope of the appended claims.

| INSTRUCTION: FxMTRXX  TITLE: Matrix add to vector |
|---|
| Description |
| This instruction is used with the matrix multiply instructions to allow a 3 × 4 matrix to be multiplied by a vector, where the last element of the vector is an implied 1. |
| Enter |
|     Ra0 = B00    Ra1 = B01    Ra2 = B02    Ra3 = B03 |
|     Ra4 = B10    Ra5 = B11    Ra6 = B12    Ra7 = B13 |
|     Ra8 = B20    Ra9 = B21    Rb0 = B22    Rb1 = B23 |
|     Rb2 = B30    Rb3 = B31    Rb4 = B32    Rb5 = B33 |
|     Rb6 = (A00 * B00) + (A01 * B10) + (A02 * B20) |
|     Rb7 = (A00 * B01) + (A01 * B11) + (A02 * B21) |
|     Rb8 = (A00 * B02) + (A01 * B12) + (A02 * B22) |
|     Rb9 = (A00 * B03) + (A01 * B13) + (A02 * B23) |
| Exit |
|     Ra0 = B00    Ra1 = B01    Ra2 = B02    Ra3 = B03 |
|     Ra4 = B10    Ra5 = B11    Ra6 = B12    Ra7 = B13 |
|     Ra8 = B20    Ra9 = B21    Rb0 = B22    Rb1 = B23 |
|     Rb2 = B30    Rb3 = B31    Rb4 = B32    Rb5 = B33 |
|     Rb6 = (A00 * B00) + (A01 * B10) + (A02 * B20) + B30 = Rb6 + Rb2 |
|     Rb7 = (A00 * B01) + (A01 * B11) + (A02 * B21) + B31 = Rb7 + Rb3 |
|     Rb8 = (A00 * B02) + (A01 * B12) + (A02 * B22) + B32 = Rb8 + Rb4 |
|     Rb9 = (A00 * B03) + (A01 * B13) + (A02 * B23) + B33 = Rb9 + Rb5 |

| INSTRUCTION: FxMTRX0  TITLE: Matrix Multiply (first element) |
|---|
| Description |
| Enter |
|     A 4 × 4 matrix in the FPC registers. |
|     And the first element (A00) of a row vector in |
|     register C. |
|     Ra0 = B00    Ra1 = B01    Ra2 = B02    Ra3 = B03 |
|     Ra4 = B10    Ra5 = B11    Ra6 = B12    Ra7 = B13 |
|     Ra8 = B20    Ra9 = B21    Rb0 = B22    Rb1 = B23 |
|     Rb2 = B30    Rb3 = B31    Rb4 = B32    Rb5 = B33 |
|     C = A00 |
| Exit |
|     Ra0 = B00    Ra1 = B01    Ra2 = B02    Ra3 = B03 |
|     Ra4 = B10    Ra5 = B11    Ra6 = B12    Ra7 = B13 |
|     Ra8 = B20    Ra9 = B21    Rb0 = B22    Rb1 = B23 |
|     Rb2 = B30    Rb3 = B31    Rb4 = B32    Rb5 = B33 |
|     C = A00 |
|     Rb6 = A00 * B00 = (C * Ra0) |
|     Rb7 = A00 * B01 = (C * Ra1) |
|     Rb8 = A00 * B02 = (C * Ra2) |
|     Rb9 = A00 * B03 = (C * Ra3) |

| INSTRUCTION: FxMTRX1 |
|---|
| TITLE: Matrix Multiply (second element) |

| Enter | | | | |
|---|---|---|---|---|
| | Ra0 = B00 | Ra1 = B01 | Ra2 = B02 | Ra3 = B03 |
| | Ra4 = B10 | Ra5 = B11 | Ra6 = B12 | Ra7 = B13 |
| | Ra8 = B20 | Ra9 = B21 | Rb0 = B22 | Rb1 = B23 |
| | Rb2 = B30 | Rb3 = B31 | Rb4 = B32 | Rb5 = B33 |
| | C = A01 | | | |
| | Rb6 = A00 * B00 | (from FxMTRX0 instruction) | | |
| | Rb7 = A00 * B01 | | | |
| | Rb8 = A00 * B02 | | | |
| | Rb9 = A00 * B03 | | | |

-continued

| INSTRUCTION: FxMTRX1 |
|---|
| TITLE: Matrix Multiply (second element) |

| Exit | | | | |
|---|---|---|---|---|
| | Ra0 = B00 | Ra1 = B01 | Ra2 = B02 | Ra3 = B03 |
| | Ra4 = B10 | Ra5 = B11 | Ra6 = B12 | Ra7 = B13 |
| | Ra8 = B20 | Ra9 = B21 | Rb1 = B22 | Rb1 = B23 |
| | Rb2 = B30 | Rb3 = B31 | Rb4 = B32 | Rb5 = B33 |
| | C = A01 | | | |
| | Rb6 = (A00 * B00) + (A01 * B10) = Rb6 + (C * Ra4) | | | |
| | Rb7 = (A00 * B01) + (A01 * B11) = Rb7 + (C * Ra5) | | | |
| | Rb8 = (A00 * B02) + (A01 * B12) = Rb8 + (C * Ra6) | | | |
| | Rb9 = (A00 * B03) + (A01 * B13) = Rb9 + (C * Ra7) | | | |

| INSTRUCTION: FxMTRX2 |
|---|
| TITLE: Matrix Multiply (third element) |

| Enter | | | | |
|---|---|---|---|---|
| | Ra1 = B00 | Ra1 = B01 | Ra2 = B02 | Ra3 = B03 |
| | Ra4 = B10 | Ra5 = B11 | Ra6 = B12 | Ra7 = B13 |
| | Ra8 = B20 | Ra9 = B21 | Rb0 = B22 | Rb1 = B23 |
| | Rb2 = B30 | Rb3 = B31 | Rb4 = B32 | Rb5 = B33 |
| | C = A02 | | | |
| | Rb6 = (A00 * B00) + (A01 * B10) | | (from FxMTRX1 instruction) | |
| | Rb7 = (A00 * B01) + (A01 * B11) | | | |
| | Rb8 = (A00 * B02) + (A01 * B12) | | | |
| | Rb9 = (A00 * B03) + (A01 * B13) | | | |
| Exit | | | | |
| | Ra0 = B00 | Ra1 = B01 | Ra2 = B02 | Ra3 = B03 |
| | Ra4 = B10 | Ra5 = B11 | Ra6 = B12 | Ra7 = B13 |
| | Ra8 = B20 | Ra9 = B21 | Rb0 = B22 | Rb1 = B23 |
| | Rb2 = B30 | Rb3 = B31 | Rb4 = B32 | Rb5 = B33 |
| | C = A02 | | | |
| | Rb6 = (A00 * B00) + (A01 * B10) + (A02 * B20) = Rb6 + (C * Ra8) | | | |
| | Rb7 = (A00 * B01) + (A01 * B11) + (A02 * B21) = Rb7 + (C * Ra9) | | | |
| | Rb8 = (A11 * B02) + (A01 * B12) + (A02 * B22) = Rb8 + (C * Rb0) | | | |
| | Rb9 = (A00 * B03) + (A01 * B13) + (A02 * B23) = Rb9 + (C * Rb1) | | | |

| INSTRUCTION: FxMTRX3 |
|---|
| TITLE: Matrix Multiply (fourth element) |

| Enter | | | | |
|---|---|---|---|---|
| | Ra0 = B00 | Ra1 = B01 | Ra2 = B02 | Ra3 = B03 |
| | Ra4 = B10 | Ra5 = B11 | Ra6 = B12 | Ra7 = B13 |
| | Ra8 = B20 | Ra9 = B21 | Rb0 = B22 | Rb1 = B23 |
| | Rb2 = B30 | Rb3 = B31 | Rb4 = B32 | Rb5 = B33 |
| | C = A03 | | | |
| | Rb6 = (A00 * B00) + (A01 * B10) + (A02 * B20) (from FxMTRX2 instruction) | | | |
| | Rb7 = (A00 * B01) + (A01 * B11) + (A02 * B21) | | | |
| | Rb8 = (A11 * B02) + (A01 * B12) + (A02 * B22) | | | |
| | Rb9 = (A00 * B03) + (A01 * B13) + (A02 * B23) | | | |
| | C = A03 | | | |
| Exit | | | | |
| | Ra0 = B00 | Ra1 = B01 | Ra2 = B02 | Ra3 = B03 |
| | Ra4 = B10 | Ra5 = B11 | Ra6 = B12 | Ra7 = B13 |
| | Ra8 = B20 | Ra9 = B21 | Rb0 = B22 | Rb1 = B23 |
| | Rb2 = B30 | Rb3 = B31 | Rb4 = B32 | Rb5 = B33 |
| | C = A03 | | | |
| | Rb6 = (A00 * B00) + (A01 * B10) + (A02 * B20) + (A03 * B30) = Rb6 + (C * Rb2) | | | |
| | Rb7 = (A00 * B01) + (A01 * B11) + (A02 * B21) + (A03 * B31) = Rb7 + (C * Rb3) | | | |
| | Rb8 = (A00 * B02) + (A01 * B12) + (A02 * B22) + (A03 * B32) = Rb8 + (C * Rb4) | | | |
| | Rb9 = (A11 * B03) + (A01 * B13) + (A0Z * B23) + (A03 * B33) = Rb9 + (C * Rb5) | | | |

| INSTRUCTION: FxCLIPR rd |
|---|
| TITLE: Reverse Clip a line to a plane (Start with Point 2) |

| Description | | |
|---|---|---|
| Entry | | |
| | Ra0 = X1 | Rb0 = X2 |
| | Ra1 = Y1 | Rb1 = Y2 |
| | Ra2 = Z1 | Rb2 = Z2 |
| | Ra3 = W1 | Rb3 = W2 |
| Exit | | |
| | If [Rb(rd) < 0] then    Rb4 = W1 + Ra(rd)    determine value "b" |

INSTRUCTION: FxCLIPR rd
TITLE: Reverse Clip a line to a plane (Start with Point 2)

```
else                        Rb4 = W1 − Ra(rd)
Ra4 = W2 − |Rb(rd)|                       determine value "a"
Rb4 = Ra4 − Rb4                           find value (a − b)
Ra4 = Ra4 / Rb4                           find value t = a/(a − b)
Ra0 = ((X1 − X2) * t) + X2    Rb0 = X2
Ra1 = ((Y1 − Y2) * t) + Y2    Rb1 = Y2
Ra2 = ((Z1 − Z2) * t) + Z2    Rb2 = Z2
Ra3 = ((W1 − W2) * t) + W2    Rb3 = W2
```

INSTRUCTION: FxCLIPF rd
TITLE: Forward Clip a line to a plane (Start with Point 1)

Entry
```
    Ra0 = X1       Rb0 = X2
    Ra1 = Y1       Rb1 = Y2
    Ra2 = Z1       Rb2 = Z2
    Ra3 = W1       Rb3 = W3
```
Exit
```
    If [Ra(rd) < 0] then    Rb4 = W2 + Rb(rd)    determine value "b"
    else                    Rb4 = W2 − Rb(rd)
    Ra4 = W1 − |Ra(rd)|                          determine value "a"
    Rb4 = Ra4 − Rb4                              find value (a − b)
    Ra4 = Ra4 / Rb4                              find value t = a/(a − b)
    Ra1 = ((X2 − X1) * t) + X1    Rb1 = X2
    Ra1 = ((Y2 − Y1) * t) + Y1    Rb1 = Y2
    Ra2 = ((Z2 − Z1) * t) + Z1    Rb2 = Z2
    Ra3 = ((W2 − W1) * t) + W1    Rb3 = W2
```

INSTRUCTION: FxCKVTX
TITLE: Check Polygon Vertex for clipping to a volume Description The FxCKVTX instruction allows the determination of whether a vertex is contained within a clipping volume. It may also be used with list of vertices describing a polygon to determine if the entire polygon is totally within the clipping volume, totally outside the clipping volume or if it is partially within the clipping volume.

Entry

On entry Ra0-Ra3 contain the coordinates for the Vertex to check.
```
    Ra0 = X1
    Ra1 = Y0
    Ra2 = Z0
    Ra3 = W0
```
Exit The Status is set (ZGT, ZLT, YGT, YLT, XGT, and XLT) according to position.
```
    V = 1       Vertex out
    Z = 1       Vertex in
```
If repeated for all vertices in a polygon then:

| V | Z | |
|---|---|---|
| 0 | 0 | The polygon crosses the boundary of the clipping volume |
| 0 | 1 | The polygon is totally inside the clipping volume |
| 1 | 0 | The polygon is totally outside the clipping volume |
| 1 | 1 | not valid |

The boundaries of the clipping volume that are crossed by the polygon may be determined by the ZGT, ZLT, YGT, YLT, XGT, and XLT bits.

INSTRUCTION: FxBACKF
TITLE: Backface Test
Test Polygon for facing direction Description A convex polygon is tested to determine whether it is facing the current view area or if it is facing away from the current view area. This allows the elimination of polygons that do not need to be drawn in the current image. The first three vertices of the polygon are entered and tested as to rotation direction (clockwise is forward facing, counter-clockwise is backward facing).

INSTRUCTION: FxBACKF
TITLE: Backface Test
Test Polygon for facing direction Entry Three polygon vertices in the FPC registers
```
    Ra0 = X0      Ra4 = X1      Rb0 = X2
    Ra1 = Y1      Ra5 = Y1      Rb1 = Y2
    Ra2 = Z1      Ra6 = Z1      Rb2 = Z2
    Ra3 = W0      Ra7 = W1      Rb3 = W2
```
where Xn,Yn,Zn,Wn are the coordinates of vertex Vn.

-continued

| INSTRUCTION: FxBACKF |
|---|
| TITLE: Backface Test |
| Test Polygon for facing direction |

Exit

On completion of this instruction the N and Z status bits are set to indicate the following:

| N | Z | Description |
|---|---|---|
| 0 | 0 | Plane is forward facing |
| 0 | 1 | Plane is parallel to view (reject or draw as line) |
| 1 | 0 | Plane is backward facing |
| 1 | 1 | Plane is backward facing |

| INSTRUCTION: FxOUTC3 rd |
|---|
| TITLE: Compare a line to a clipping volume |

Description

Given the two vertices of a line in the FPC.Set the Z, N and V bits of the status register if the line crosses either of the boundaries of the canonical clipping volume defined by W0 and W1 according to:
set (N = 1) if (|Ra3| − |Ra(rd)|) < 0
set (V = 1) if (|Rb3| − |Rb(rd)|) < 0
set (Z = 1) if (N = 1) and (V = 1) and [Sign Ra(rd) = Sign Rb(zd)]

Entry
Ra0 = X0            Rb0 = X1
Ra1 = Y0            Rb1 = Y1
Ra2 = Z0            Rb2 = Z1
Ra3 = W0            Rb3 = W1

Exit

| Z | N | V | |
|---|---|---|---|
| 0 | 0 | 0 | Both vertices of line inside the clipping volume |
| 0 | 0 | 1 | Vertex V0 of line outside the clipping volume |
| 0 | 1 | 0 | Vertex V1 of line outside the clipping volume |
| 0 | 1 | 1 | Both vertices out on opposite sides of the clipping volume |
| 1 | X | X | Both vertices out on the same side of the clipping volume |

| INSTRUCTION: FxSCALE |
|---|
| TITLE: Scale and convert coordinates for a viewport |

Description

Sn is viewport scaling constants.
Cn is center of viewport constants.

Entry
Ra0 = X0       Ra8 = Cx       Rb6 = Sx
Ra1 = Y0       Rag = Cy       Rb7 = Sy
Ra2 = Z0       Rb9 = Cz       Rb8 = Sz
Ra3 = W0

Exit
Ra0 = X        Ra8 = Cx       Rb6 = Sx
Ra1 = Y        Ra9 = Cy       Rb7 = Sy
Ra2 = Z        Rb9 = Cz       Rb8 = Sz
Ra3 = 1/W0

| INSTRUCTION: FxVADD |
|---|
| TITLE: Vector Add |
| V0 = V0 + V1 |

Description

Add the X, Y and Z components of a vector in Rb0-Rb2 to the X, Y, and Z components of a vector in Ra0-Ra2.

Entry
Ra0 = X0            Rb0 = X1
Ra1 = Y0            Rb1 = Y1
Ra2 = Z0            Rb2 = Z1

Exit
Ra0 = X0 + X1       Rb0 = X1
Ra1 = Y0 + Y1       Rb1 = Y1

| INSTRUCTION: FxVADD |
|---|
| TITLE: Vector Add |
| V0 = V0 + V1 |

Ra2 = Z0 + Z1       Rb2 = Z1

| INSTRUCTION: FxVCROS |
|---|
| TITLE: Vector Cross Product |
| V0 = V0 × V1 |

Description

Given two vectors in Ra0-Ra2 and Rb0-Rb2, find their vector cross product

Entry
Ra0 = X0            Rb0 = X1
Ra1 = Y0            Rb1 = Y1
Ra2 = Z0            Rb2 = Z1

Exit
Ra0 = (Y0 * Z1) − (Y1 * Z0)      Rb0 = X1
Ra1 = (Z0 * X1) − (Z1 * X0)      Rb1 = Y1
Ra2 = (X0 * Y1) − (X1 * Y0)      Rb2 = Z1
C = (X0 * Y1)

| INSTRUCTION: FxVDOT |
|---|
| TITLE: Vector Dot Product |
| C = ((X0*X1)+(Y0*Y1)+(Z0*Z1)) |

Description

Given two vectors in Ra0-Ra2 and Rb0-Rb2, calculate the dot product in C.

Entry
Ra0 = X0            Rb0 = X1
Ra1 = Y0            Rb1 = Y1
Ra2 = Z0            Rb2 = Z1

Exit
Ra0 = X0            Rb0 = X1
Ra1 = Y0            Rb1 = Y1
Ra2 = Z0            Rb2 = Z1
C = (X0 * X1) + (Y0 * Y1) + (Z0 * Z1)

| INSTRUCTION: FxVMAG |
|---|
| TITLE: Vector Magnitude |
| C = SQRT((X0*X0)+(Y0*Y0)+(Z0*Z0)) |

Description

Given a vector in Ra0-Ra2, compute the length of the vector in C.

Entry
Ra0 = X0
Ra1 = Y0
Ra2 = Z0

Exit
Ra0 = X0                 Rb0 = (X0 * X0)
Ra1 = Y0                 Rb1 = (Y0 * Y0)
Ra2 = Z0
Ra3 = (X0 * X0) + (Y0 * Y0) + (Z0 * Z0)
C = SQRT((X0 * X0) + (Y0 * Y0) + (Z0 * Z0))

| INSTRUCTION: FxVNORM |
|---|
| TITLE: Vector Normalization |

Description

Given a vector in Ra0-Ra2, find the unit length vector that is in the same direction as the given vector and place that vector in Ra0-Ra2.

Entry
Ra0 = X0
Ra1 = Y0
Ra2 = Z0

Exit
Ra0 = X0 / (SQRT((X0 * X0) + (Y0 * Y0) (Z0 * Z0)))

INSTRUCTION: FxVNORM
TITLE: Vector Normalization

Rb0 = (X0 * X0)
Ra1 = Y0 / (SQRT((X0 * X0) + (Y0 * Y0) + (Z0 * Z0)))
Rb1 = (Y0 * Y0)
Ra2 = Z0 / (SQRT((X0 * X0) + (Y0 * Y0) + (Z0 * Z0)))
Ra3 = SQRT((X0 * X0) + (Y0 * Y0) + (Z0 * Z0))
C = 1/SQRT((X0 * X0) + (Y0 * Y0) + (Z0 * Z0))

INSTRUCTION: FxVRFLCT
TITLE: FPC Vector Reflection

Description
  Assume a Vector Normal to a surface in Ra0–Ra2 and an incident vector in Rb0–Rb2. Find the Vector equivalent to the reflection of the incident vector and place its X, Y, and Z, components In Ra0–Ra2.
Entry
Ra0 = Xn     Rb0 = Xi
Ra1 = Yn     Rb1 = Yi
Ra2 = Zn     Rb2 = Zi
Exit
Ra0 = Xr = Xn * (2 * ((Xn * Xr) + (Yn * Yr) + (Zn * Zr))) − Xi
Ra1 = Yr = Yn * (2 * ((Xn * Xr) + (Yn * Yr) + (Zn * Zr))) − Yi
Ra2 = Zr = Zn * (2 * ((Xn * Xr) + (Yn * Yr) + (Zn * Zr))) − Zi
Rb0 = Xi
Rb1 = Yi
Rb2 = Zi
C = 2 * ((Xn * Xr) + (Yn * Yr) + (Zn * Zr))
C = 2 * cos(Theta)

INSTRUCTION: FxVSCL rd
TITLE: FPC Vector Scaling
Multiply a vector by a scalar Description
  The X, Y, and Z components of a vector which are loaded into FPC registers Ra0–Ra2 are multiplied by a scalar in rd.
Entry
  Ra0 = X                          rd = S
  Ra1 = Y
  Ra2 = Z
Exit
  Ra0 = X * S                      rd = S
  Ra1 = Y * S
  Ra2 = Z * S

INSTRUCTION: FxVSUB
TITLE: FPC Vector Subtract
V0 = V0 = V1

Description
  Subtract a vector in Rb0–Rb2 from a vector in Ra0–Ra2.
Entry
  Ra0 = X0                         Rb0 = X1
  Ra1 = Y0                         Rb1 = Y1
  Ra2 = Z0                         Rb2 = Z1
Exit
  Ra0 = X0 − X1                    Rb0 = X1
  Ra1 = Y0 − Y1                    Rb1 = Y1
  Ra2 = Z0 − Z1                    Rb2 = Z1

INSTRUCTION: FMTRAN
TITLE: Matrix Transpose

Description
  This instruction transposes a matrix. (Interchange the row and column elements of the matrix.
Entry
  Ra0 = B00    Ra1 = B01    Ra2 = B02    Ra3 = B03
  Ra4 = B10    Ra5 = B11    Ra6 = B12    Ra7 = B13
  Ra8 = B20    Ra9 = B21    Rb0 = B22    Rb1 = B23
  Rb2 = B30    Rb3 = B31    Rb4 = B32    Rb5 = B33
Exit
  Ra0 = B00    Ra1 = B10    Ra2 = B20    Ra3 = B30
  Ra4 = B01    Ra5 = B11    Ra6 = B21    Ra7 = B31
  Ra8 = B02    Ra9 = B12    Rb0 = B22    Rb1 = B32
  Rb2 = B03    Rb3 = B13    Rb4 = B23    Rb5 = B33

What is claimed is:

1. A coprocessor comprising:
a bus for communicating data to and from an external source;
a plurality of registers for the acceptance of data from either an internal or an external source via said bus;
a processing unit;
a memory containing coded instructions for controlling said processing unit, said coded instructions operable for moving data in and out of said registers and to and from said bus during the performance of any of said coded instructions; and
a circuit operable in response to institution of a particular set of said coded instructions upon receipt of a single instruction via said bus for providing matrix calculations on data stored in said plurality of registers where certain intermediate results are stored in said registers while other intermediate results remain within said circuit available for subsequent use, thereby reducing the number of storage registers required during any matrix arithmetic operation.

2. The coprocessor set forth in claim 1, wherein said last-mentioned circuit is further operative in response to said institution of a particular set of said coded instructions for performing a matrix multiplication on up to 4×4 matrices using only 20 registers for storing said intermediate results.

3. The coprocessor set forth in claim 1, wherein said bus is connected to at least one host processor, and wherein said single instruction and said data comes from said host over said bus.

4. The coprocessor set forth in claim 3, wherein said intermediate results stored in said registers are not communicated to said host processor.

5. The coprocessor set forth in claim 1, wherein said last-mentioned circuit is further operative in response to said institution of a particular set of said coded instructions for performing a matrix multiplication on square matrices storing said intermediate results in a number of registers, said number being equal to the number of rows squared plus the number of rows.

6. The coprocessor in claim 5, wherein said memory contains one instruction for multiplying each column in a matrix by a constant and adding the result to the contents of a result vector and storing the result of said addition in said result vector.

7. The coprocessor in claim 6, wherein the matrix has less than five rows.

8. A method of performing matrix calculations in a graphics processing system having a coprocessor, comprising the steps of communicating data to and from said coprocessor over a bus from and to an external source;
obtaining coded instructions from a memory;

accepting data in a plurality of registers from either an internal or an external source via said bus;

operating a processing unit to process said matrix calculations from coded instructions obtained from said memory;

programming said processing unit so that said coded instructions are operable for moving data in and out of said registers and to and from said bus during the performance of any of said coded instructions; and providing matrix calculations in response to institution of a particular set of said coded instructions upon receipt of a single instruction via said bus where certain intermediate results are stored in said registers while other intermediate results remain within said circuitry available for subsequent use, thereby reducing the number of storage registers required during any matrix arithmetic operation.

9. The method set forth in claim 8, wherein said last-mentioned step is further operative in response to said institution of a particular set of said coded instructions for performing a matrix multiplication on up to 4×4 matrices wherein for each column in a matrix said single instruction is an instruction for multiplying said column by a constant and adding the result to the contents of a result vector and storing the result of the adding in said result vector, thereby using only 20 registers for storing said intermediate results.

10. The method set forth in claim 9, further comprising the step of storing in said registers said intermediate results while not necessarily communicating said results over said bus.

11. The method of claim 9, wherein said providing step responds to further instructions for multiplying a constant with the first, second, third and fourth columns.

12. The method of claim 11, wherein the instruction which multiplies the first column with a constant, further causes its results to be stored in a vector comprising up to four registers in said plurality of registers, and the instructions which multiply the second, third, and fourth columns, respectively, further cause their respective results to be added to the contents of said vector and storing the result of said addition back into said vector.

13. The method of claim 9 wherein said constant is stored in a register.

14. The method of claim 8 wherein in the step of accepting data said data comprises a matrix which is stored into 16 or fewer registers.

* * * * *